US009004350B2

(12) United States Patent
Doi

(10) Patent No.: US 9,004,350 B2
(45) Date of Patent: Apr. 14, 2015

(54) MONEY HANDLING APPARATUS

(75) Inventor: Kazuhiro Doi, Hyogo (JP)

(73) Assignee: Glory Ltd., Himeji-Shi, Hyogo (JP)

( * ) Notice: Subject to any disclaimer, the term of this patent is extended or adjusted under 35 U.S.C. 154(b) by 358 days.

(21) Appl. No.: 13/126,391

(22) PCT Filed: Oct. 28, 2008

(86) PCT No.: PCT/JP2008/003058
§ 371 (c)(1),
(2), (4) Date: Apr. 27, 2011

(87) PCT Pub. No.: WO2010/049968
PCT Pub. Date: May 6, 2010

(65) Prior Publication Data

US 2011/0202173 A1 Aug. 18, 2011

(51) Int. Cl.
*G06Q 40/00* (2012.01)
*G07D 11/00* (2006.01)

(52) U.S. Cl.
CPC .......... *G07D 11/006* (2013.01); *G07D 11/0051* (2013.01)

(58) Field of Classification Search
CPC .......... G07D 11/0084; G07D 11/0018; G07D 11/0054; G07D 11/0003; G07D 11/0021; G07D 11/0006; G07D 11/0012
USPC .................................................. 235/379, 380
See application file for complete search history.

(56) References Cited

U.S. PATENT DOCUMENTS 4,629,382 A * 12/1986 Ueshin ....................... 414/790.5
4,744,468 A * 5/1988 Goi et al. ...................... 209/534
6,015,147 A * 1/2000 Kimura et al. ................ 271/163
2004/0134839 A1 7/2004 Kobayashi et al. ........... 209/534
2008/0128487 A1 6/2008 Graef et al.

FOREIGN PATENT DOCUMENTS

| | | | |
|---|---|---|---|
| EP | 1 008 965 A1 | 6/2000 | |
| JP | 06-187538 | 7/1994 | G07D 9/00 |
| JP | 07-234955 | 9/1995 | G07D 9/00 |
| JP | 10-302119 | 11/1998 | G07D 9/00 |
| JP | 2000-59882 | 9/2000 | G07D 3/00 |

(Continued)

OTHER PUBLICATIONS

European Search Report (Application No. 08877681.0—PCT/JP2008/003058) (9 pages—dated Mar. 1, 2013).

*Primary Examiner* — Christopher Stanford
(74) *Attorney, Agent, or Firm* — Renner, Kenner, Greive, Bobak, Taylor & Weber

(57) ABSTRACT

A money handling apparatus for performing at least depositing includes: a casing; a depositing unit; a recognition unit configured to at least count or recognize money fed from the depositing unit; an inner storage unit from which the money stored therein is unremovable directly from the outside of the casing; an outer stacking unit from which the money stacked therein is removable directly from the outside of the casing; a transport unit configured to transport the money among the above-described units; and a controller configured to allow selective transport of the money handled by the recognition unit to the inner storage unit, or the outer stacking unit. The controller transfers the money to the inner storage unit when a first deposit mode is selected by a selection signal, or transfers the money to the outer stacking unit when a second deposit mode is selected.

19 Claims, 12 Drawing Sheets

(56) References Cited

FOREIGN PATENT DOCUMENTS

| | | | |
|---|---|---|---|
| JP | 2003-030714 | 1/2003 | ............... G07D 9/00 |
| WO | WO 2007/101880 A2 | 9/2007 | ............. G07D 11/00 |
| WO | WO 2007/101880 A3 | 9/2007 | ............. G07D 11/00 |

* cited by examiner

MONEY HANDLING APPARATUS

TECHNICAL FIELD

The present invention relates to a money handling apparatus for depositing and/or dispensing money.

BACKGROUND ART

Patent Document 1 discloses, for example, a depositing and dispensing machine which is placed in a teller counter of a bank, and is shared by two tellers on the right and left sides of the machine. The depositing and dispensing machine is a so-called circulating depositing and dispensing machine. Specifically, the machine includes, in a casing, a depositing unit in which banknotes are introduced, a recognition unit configured to count and recognize the banknotes, an escrow unit configured to temporarily retain the recognized banknotes, a storage unit configured to store the banknotes retained in the escrow unit after the deposit of the banknotes is confirmed, and a dispensing unit which is provided with a shutter, and from which the banknotes fed from the storage unit are dispensed in dispensing.

The depositing and dispensing machine performs the depositing in the following manner. Specifically, the banknotes are introduced in the depositing unit. Then, an operation for starting the predetermined depositing is performed. Then, the banknotes introduced in the depositing unit are fed one by one, and are recognized and counted by the recognition unit. The recognized banknotes are temporarily retained in the escrow unit. When the deposit of the banknotes is confirmed with all the banknotes introduced in the depositing unit fed and temporarily retained in the escrow unit, the banknotes temporarily retained in the escrow unit are stored in the storage unit. Thus, the depositing is finished. When an operation for canceling the deposit of the banknotes is performed with all the banknotes introduced in the depositing unit fed and temporarily retained in the escrow unit, the banknotes temporarily retained in the escrow unit are not stored in the storage unit, but are returned to the depositing unit.

In this depositing and dispensing machine, the escrow unit may become full when a large amount of banknotes is deposited at a time. In this case, conventional depositing and dispensing machines may experience the following disadvantage. Specifically, when the escrow unit becomes full, the depositing cannot proceed. Accordingly, for example, a predetermined operation has to be performed to store the banknotes in the escrow unit in the storage unit. Then, when the storage unit is filled with the banknotes, the casing has to be opened to expose the storage unit outside to remove the banknotes stored in the storage unit. Thus, in depositing a large amount of banknotes at a time in the conventional depositing and dispensing machine, the teller has to carry out a certain operation to take care of the apparatus every time when the escrow unit or the storage unit becomes full, which is troublesome to the teller. Further, the depositing is interrupted every time when the teller carries out the operation, thereby increasing time required for the depositing. This increases customers'waiting time, and decreases efficiency of transactions at teller's windows.

As disclosed by Patent Document 2, for example, increasing a capacity of the escrow unit may be a possible solution to such a disadvantage. This can prevent the escrow unit from becoming full.

However, even when the capacity of the escrow unit is increased, some operation has to be performed during the depositing as described above when the amount of the deposited banknotes exceeds the increased capacity of the escrow unit.

Further, increase in capacity of the escrow unit in the casing increases the size of the apparatus. This is not preferable for the depositing and dispensing machine placed in the teller counter. To precisely stack the banknotes in the escrow unit of increased capacity, a mechanism for processing the banknotes is required as disclosed by Patent Document 2, for example. The provision of the processing mechanism disadvantageously complicates the structure of the apparatus. Increasing the capacity of the storage unit may be another solution to the above disadvantage. However, also in this case, the size of the apparatus increases. The same is applied to the apparatus in which the escrow unit is not provided, and the banknotes are directly stored in the storage unit.

For example, Patent Document 3 discloses a banknote processing machine including a depositing unit, a recognition unit, and a stacking unit configured to stack the banknotes which are introduced in the depositing unit, and are recognized by the recognition unit. In this machine, the stacking unit is open outside the casing, and the banknotes stacked therein can easily be removed by hand. Thus, in handling a large amount of banknotes at a time in this machine, the banknotes stacked in the stacking unit can quickly be removed by hand before, or immediately after the stacking unit becomes full. This can avoid interruption of the depositing, or allows easy restart of the depositing, if interrupted. This can reduce a period for the interruption as much as possible.

However, this machine is merely a banknote processing machine which does not include the storage unit configured to store the banknotes, and cannot perform the depositing and the dispensing.

The depositing in the depositing and dispensing machine has been described above. However, the same disadvantage occurs in the dispensing. Specifically, in dispensing a large amount of banknotes at a time, the dispensing is interrupted, and the shutter has to be opened to remove the banknotes from the dispensing unit every time when the dispensing unit becomes full.

Such a disadvantage is not particular to the depositing/dispensing of the banknotes in/from the depositing and dispensing machine. The same disadvantage may occur in depositing and dispensing coins.

CITATION LIST

Patent Documents

[Patent Document 1] Japanese Patent Publication No. 2003-30714

[Patent Document 2] Japanese Patent Publication No. H07-234955

[Patent Document 3] Japanese Patent Publication No. 2000-259882

SUMMARY OF THE INVENTION

Technical Problem

In view of the foregoing, the present invention has been achieved. An object of the invention is to increase efficiency of at least the depositing, or at least the dispensing performed by the money handling apparatus.

Solution to the Problem

According to an aspect of the present invention, a money handling apparatus for performing at least depositing includes: a casing; a depositing unit including a feeding mechanism configured to feed one by one money introduced therein; a recognition unit configured to at least count or recognize the money fed from the depositing unit; an inner storage unit configured to store the money handled by the recognition unit, the money stored therein being unremovable directly from the outside of the casing; an outer stacking unit configured to stack the money handled by the recognition unit, the money stacked therein being removable directly from the outside of the casing; a transport unit configured to transport the money among the depositing unit, the recognition unit, the inner storage unit, and the outer stacking unit; and a controller configured to control the depositing unit, the recognition unit, the inner storage unit, the outer stacking unit, and the transport unit to selectively transport the money handled by the recognition unit to the inner storage unit, or the outer stacking unit.

In this money handling apparatus, a first deposit mode or a second deposit mode is selectable as a mode for the depositing, and the controller allows transport of the money handled by the recognition unit to the inner storage unit to be stored in the inner storage unit when the first deposit mode is selected by a selection signal, or the controller allows transport of the money handled by the recognition unit to the outer stacking unit to be stacked in the outer stacking unit when the second deposit mode is selected by the selection signal.

With this configuration, the money which is recognized, and/or counted by the recognition unit are selectively transported to the outer stacking unit, or the inner storage unit. The money stored in the inner storage unit is unremovable directly from the outside of the casing, i.e., the money cannot be removed unless the casing is opened, for example. In contrast, the money stacked in the outer stacking unit is removable directly from the outside of the casing.

Thus, for example, when the second deposit mode is a mode for depositing a large amount of money, the money handled by the recognition unit is transported to the outer stacking unit, and is stacked therein. Therefore, the money stacked in the outer stacking unit can easily be removed before, or even after the outer stacking unit becomes full. This can avoid interruption of the depositing, or allows easy restart of the depositing, if interrupted, thereby reducing a period for the interruption as much as possible.

When the first deposit mode is a mode for depositing the money in an amount which does not fill the inner storage unit (or the escrow unit), the inner storage unit (or the escrow unit) does not become full during the depositing in the first deposit mode, and the depositing is not interrupted. Thus, efficiency of the depositing is less likely to decrease in any mode.

According to another aspect of the present invention, a money handling apparatus for performing at least depositing includes: a casing; a depositing unit including a feeding mechanism configured to feed one by one money introduced therein; a recognition unit configured to at least count or recognize the money fed from the depositing unit; an inner storage unit configured to store the money handled by the recognition unit, the money stored therein being unremovable directly from the outside of the casing; an outer stacking unit configured to stack the money handled by the recognition unit, the money stacked therein being removable directly from the outside of the casing; a transport unit configured to transport the money among the depositing unit, the recognition unit, the inner storage unit, and the outer stacking unit; and a controller configured to control the depositing unit, the recognition unit, the inner storage unit, the outer stacking unit, and the transport unit to selectively transport the money handled by the recognition unit to the inner storage unit, or the outer stacking unit.

The controller is connected to a destination designating unit configured to designate a destination of the money based on a kind of the money, and is capable of receiving a designating signal from the destination designating unit. When kinds of the money are designated by the designating signal, the controller allows transport of some of the money, which are recognized by the recognition unit, and are of the designated kind to be transported to the outer stacking unit, to the outer stacking unit to be stored therein, and the controller allows transport of some of the money, which are recognized by the recognition unit, and are of the designated kind to be transported to the inner storage unit, to the inner storage unit to be stored therein.

With this configuration, as described above, the interruption of the depositing is avoided, and the depositing can easily be restarted, if interrupted, thereby reducing a period for the interruption as much as possible. Further, the money is sorted by kind, thereby improving convenience. This is effective for depositing a certain kind of the money to be sorted, i.e., money of a certain denomination, fit money, unfit money, money of national currency, money of foreign currency, etc. For example, this is effective for depositing the money in which a certain kind of the money is relatively larger in amount than the other kinds of the money.

The controller may allow transport of the money handled by the recognition unit to the outer stacking unit to be stacked therein when a predetermined amount of the money has been stored in the inner storage unit.

With this configuration, the inner storage unit is prevented from becoming full, and the interruption of the depositing can be avoided.

The money handling apparatus may further include: a memory configured to store the numbers of different kinds of the deposited money, wherein the memory stores at least one of the numbers of the different kinds of the money stored in the inner storage unit, or the numbers of the different kinds of the money stacked in the outer stacking unit.

The money handling apparatus may further include: a dispensing unit configured to dispense the money handled by the recognition unit, wherein the controller allows feeding of the money stored in the inner storage unit, and dispensing of the fed money to the dispensing unit as the dispensing.

The outer stacking unit may be capable of storing a larger amount of the money than an amount of the money storable in the depositing unit.

According to still another aspect of the present invention, a money handling apparatus for performing at least dispensing includes: a casing; an inner storage unit provided in the casing to store money therein; a recognition unit configured to at least count or recognize the money fed from the inner storage unit one by one; a dispensing unit configured to dispense the money handled by the recognition unit; an outer stacking unit which is capable of storing a larger amount of the money than an amount of the money storable in the dispensing unit, and stacking the money handled by the recognition unit, the money stacked therein being removable directly from the outside of the casing; a transport unit configured to transport the money among the storage unit, the recognition unit, the dispensing unit, and the outer stacking unit; and a controller configured to control the inner storage unit, the recognition unit, the dispensing unit, the outer stacking unit, and the transport unit to selectively transport the money handled by the recognition unit to the dispensing unit, or the outer stacking unit.

With this configuration, the money which is recognized and/or counted by the recognition unit is selectively transported to the outer stacking unit, or the dispensing unit. The outer stacking unit has a larger capacity than the capacity of the dispensing unit, and the money stacked therein is removable directly from the outside of the casing. Therefore, the outer stacking unit can stack a large amount of money, and allows easy removal of the money stacked therein.

Thus, in handling (e.g., in dispensing) a large amount of money, the money handled by the recognition unit is transported to the outer stacking unit, and is stacked therein. This can avoid interruption of the dispensing, or allows easy restart of the dispensing, if interrupted, thereby reducing a period for the interruption as much as possible.

A first dispense mode or a second dispense mode is selectable as a mode for the dispensing, and the controller allows transport of the money handled by the recognition unit to the dispensing unit when the first dispense mode is selected by a selection signal, or allows transport of the money handled by the recognition unit to the outer stacking unit when the second dispense mode is selected by the selection signal.

When the first dispense mode is a mode for dispensing the money in an amount which does not fill the dispensing unit, for example, the dispensing unit does not become full during the dispensing, and the dispensing is not interrupted in the first dispense mode. In the second dispense mode, the money is stacked in the outer stacking unit. Thus, when the money in an amount which fills the dispensing unit is dispensed, the dispensing is not interrupted like in the first dispense mode, or the dispensing, if interrupted, can easily be restarted to reduce a period of the interruption as much as possible. Thus, the efficiency of the dispensing is less likely to decrease in any mode.

The controller may be connected to a destination designating unit configured to designate a destination of the money based on a kind of the money, and is capable of receiving a designating signal from the destination designating unit. When the kinds of the money is designated by the designating signal, the controller may allow transport of some of the money, which are recognized by the recognition unit, and are of the designated kind to be transported to the outer stacking unit, to the outer stacking unit, and the controller may allow transport of some of the money, which are recognized by the recognition unit, and are of the designated kind to be transported to the dispensing unit, to the dispensing unit.

With this configuration, the money is sorted by kind, thereby improving convenience. This is effective for dispensing a certain kind of the money to be sorted, i.e., money of a certain denomination, fit money, unfit money, money of national currency, money of foreign currency, etc. For example, this is particularly effective for dispensing the money in which a certain kind of the money is relatively larger in amount than the other kinds of the money.

The outer stacking unit may be divided into a plurality of stacking regions configured to stack the money, respectively, and a capacity ratio between the plurality of stacking regions may be variable.

With this configuration, the money stacked in the outer stacking unit can be sorted by kind, i.e., denomination, whether the money is fit or unfit, etc. Further, the space of the outer stacking unit can efficiently be used, thereby improving convenience.

The outer stacking unit may be separated from the casing, and may detachably be attached to the casing. With this configuration, the outer stacking unit can be retrofitted to the casing. Thus, the outer stacking unit can be retrofitted as needed.

Advantages of the Invention

According to the present invention, particularly in depositing or dispensing a large amount of money at a time, the depositing or dispensing is not interrupted, or the depositing or dispensing, if interrupted, can easily be restarted, thereby reducing a period for the interruption as much as possible. This can improve efficiency in handling the money.

DESCRIPTION OF EMBODIMENTS

An embodiment of the present invention will be described in detail with reference to the drawings. The following preferred embodiment will be set forth merely for the illustration purpose, and are not intended to limit the scope, applications, and use of the invention.

Figure 1:
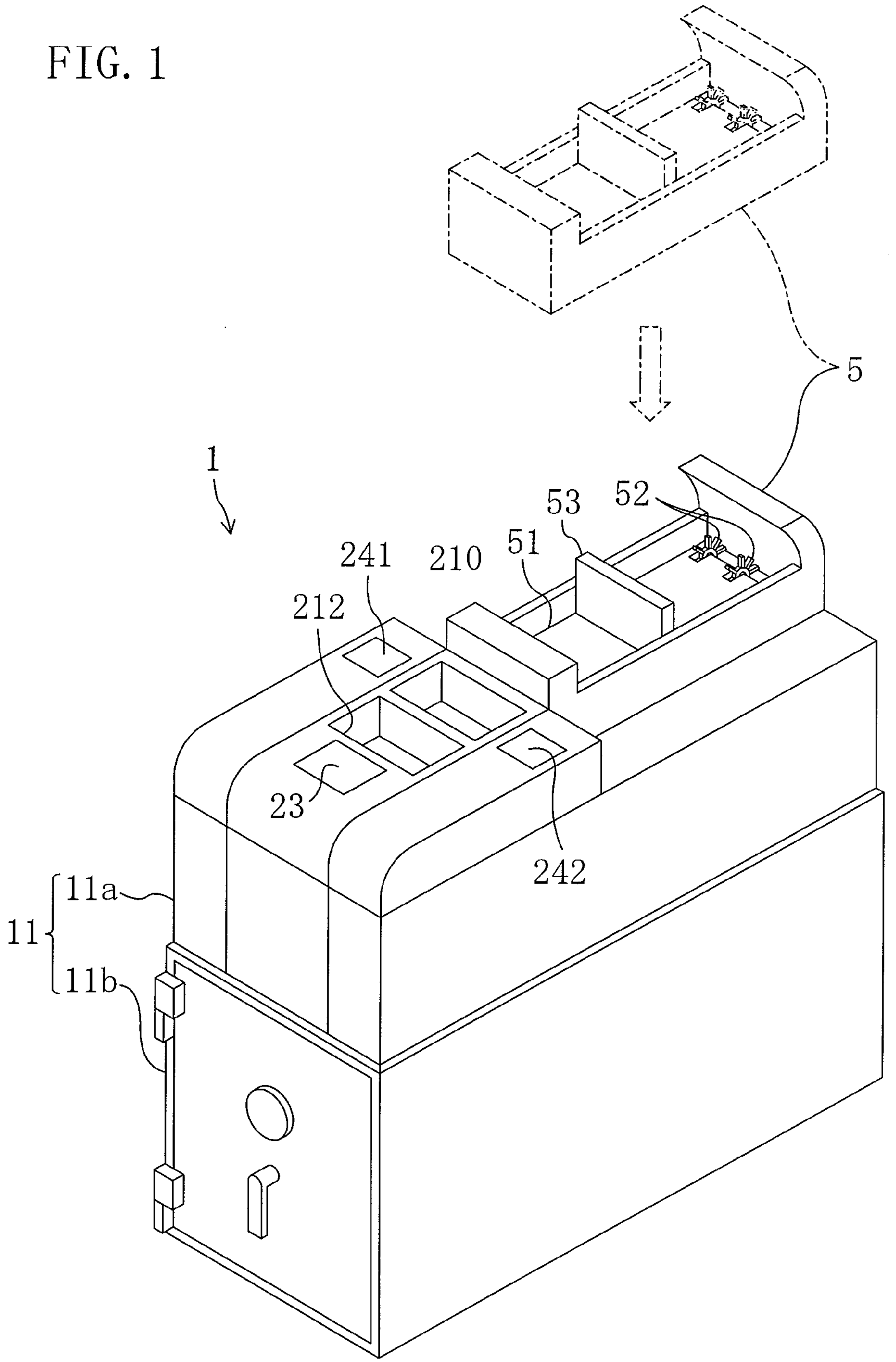
FIG. 1 is a perspective view illustrating the general structure of a banknote depositing and dispensing machine.
Figure 2:
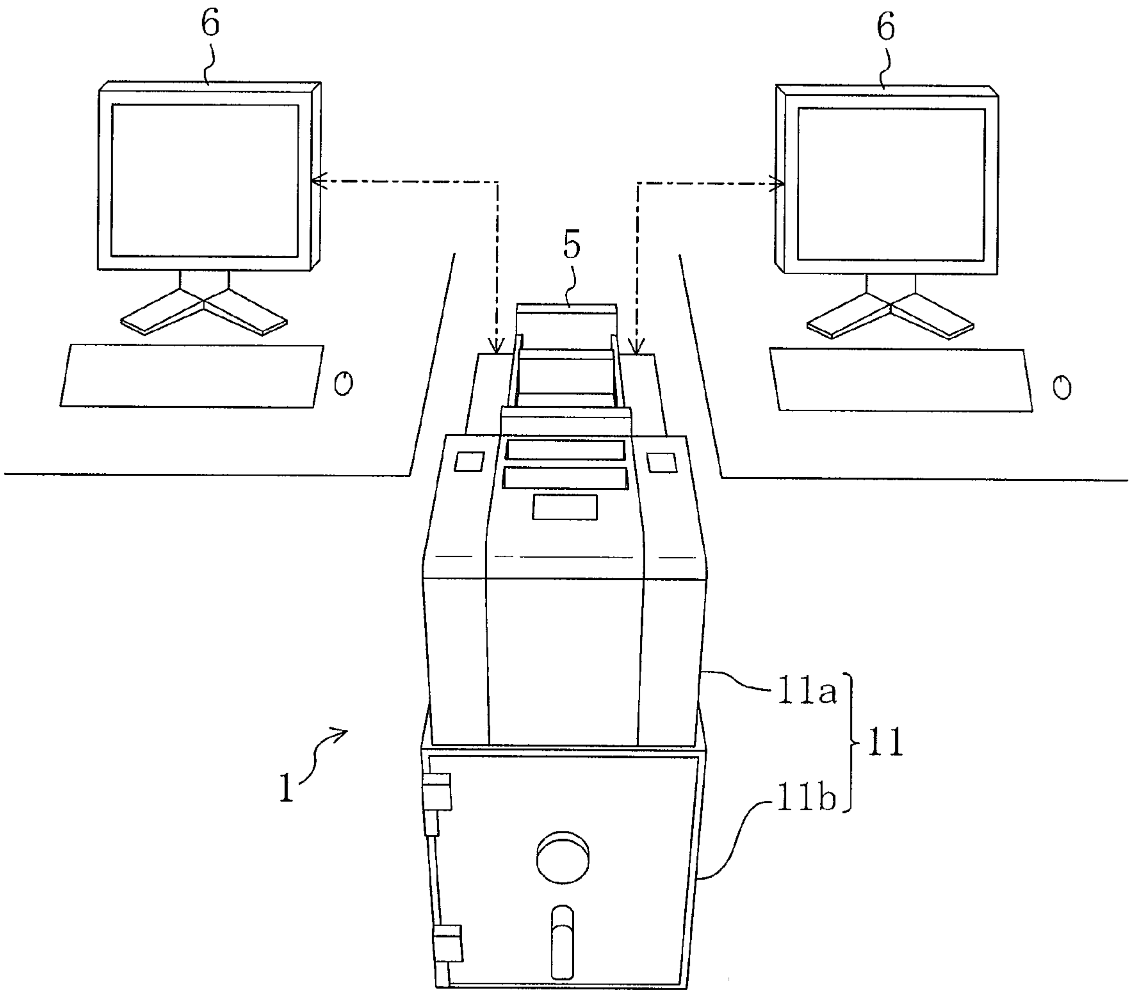
FIG. 2 is a perspective view illustrating the depositing and dispensing machine in use.

FIG. 1 is a perspective view illustrating a depositing and dispensing machine 1 as an example of a money handling apparatus. As shown in FIG. 2, the depositing and dispensing machine 1 is substantially in the shape of a rectangular box having a relatively short width, and a relatively long depth. For example, the depositing and dispensing machine 1 is placed in a teller counter of a bank, and is shared by two tellers on the right and left sides of the depositing and dispensing machine 1. Two higher-ranking terminals 6 used by the right and left tellers, respectively, are connected to the depositing and dispensing machine 1. The tellers use the depositing and dispensing machine 1 by operating the higher-ranking terminals 6, respectively.

A casing 11 of the depositing and dispensing machine 1 is roughly divided into an upper body 11*a* and a lower safe unit 11*b* As shown in FIGS. 1-4, the body 11*a* includes a depositing unit 211 having an inlet 210 through which banknotes are introduced, a dispensing unit 213 having an outlet through which the banknotes are dispensed, a recognition unit 214 configured to recognize the banknotes, an escrow unit 215 configured to temporarily retain the recognized banknotes in the depositing, and a transport unit 4 which includes a transport path mutually connecting the depositing unit 211, the dispensing unit 213, the recognition unit 214, and the escrow unit 215, and transports the banknotes through the transport path in a long edge feed manner. The safe unit 11*b* includes an inner storage unit 3 configured to store the banknotes. The depositing and dispensing machine 1 is configured to be a so-called circulating depositing and dispensing machine 1. Specifically, the depositing and dispensing machine 1 stores the banknotes in the inner storage unit 3 in the depositing, and feeds and dispenses the banknotes stored in the inner storage unit 3 in the dispensing.

The depositing and dispensing machine 1 further includes a communication unit 22 configured to transmit and receive data to and from the higher-ranking terminals 6 through communication lines, a display 23 which is arranged in the lateral center of an upper surface of the casing 11 to display various types of information, an operation unit 24 which is operated by the tellers, a memory 26 configured to store various types of data etc., and a controller 25 configured to control the above-described units 211-215, 22-24, 26, and 3-5.

The operation unit 24 includes a left occupation switch 241 arranged at a left end of the upper surface of the casing 11, and a right occupation switch 242 arranged at a right end of the upper surface of the casing 11. The two tellers share the depositing and dispensing machine 1, but they cannot use the machine at the same time. The left occupation switch 241 or the right occupation switch 242 is operated when the left or right teller uses the depositing and dispensing machine 1. When the left occupation switch 241 is operated, the left teller is allowed to use the depositing and dispensing machine 1. When the right occupation switch 242 is operated, the right teller is allowed to use the depositing and dispensing machine 1. The selection may be performed through the higher-ranking terminals 6.

The memory 26 stores at least an inventory amount in the machine indicating the respective numbers of the banknotes of different denominations stored in the inner storage unit 3 (a cassette 30 and stackers 31-34 described below), a deposit amount representing the respective numbers of the banknotes of different denominations deposited in the depositing, an inner deposit amount representing the respective numbers of the banknotes of different denominations stored in the inner storage unit 3 in the depositing, and an outer deposit amount representing the respective numbers of the banknotes of different denominations stacked in an outer stacking unit 5 described below in the depositing. Further, the memory 26 may store the inventory amount, the deposit amount, the inner deposit amount, and the outer deposit amount each indicating the respective numbers of the banknotes sorted by kind of the banknotes except for the denomination, i.e., whether the banknotes are fit or unfit, whether the banknotes are of national currency or foreign currency, etc. The banknotes may be sorted by two or more kinds, for example, the denomination and whether the banknotes are fit or unfit, etc.

In the depositing and dispensing machine 1, an outer stacking unit 5 configured to stack the banknotes is detachably attached to a rear part of the upper surface of the casing 11. The outer stacking unit 5 of the present embodiment is configured as a single component, and therefore, the outer stacking unit 5 may be referred to as a stacking unit 5. The structure of the stacking unit 5 will be described in detail below.

The inlet 210 is a port in which a stack of a plurality of banknotes is introduced. As shown in FIG. 1, the inlet 210 is horizontally oriented, and is opened upward in the upper surface of the casing 11. The inlet 210 includes a shutter configured to open and close the inlet. In FIG. 1, the shutter is open, and the inlet 210 is open. The depositing unit 211 includes a mechanism configured to feed one by one the plurality of banknotes introduced in the inlet 210. In the present embodiment, the depositing unit 211 is configured to be able to contain about 100-200 banknotes. However, the capacity of the depositing unit 211 is not limited thereto.

The dispensing unit 213 dispenses the banknotes fed from the inner storage unit 3 in the dispensing, and returns the banknotes which are recognized as unacceptable by the recognition unit 214, e.g., rejected notes etc., in the depositing. The outlet 212 is horizontally oriented, and is opened upward in the upper surface of the casing 11 to be positioned forward of the inlet 210. Like the inlet 210, the outlet 212 includes a shutter configured to open and close the outlet. In FIG. 1, the shutter is opened, and the outlet 212 is opened. In the present embodiment, the dispensing unit 213 is configured to be able to contain about 100-200 banknotes. However, the capacity of the dispensing unit 213 is not limited thereto.

The recognition unit 214 recognizes at least whether each of the banknotes fed from the depositing unit 211 is genuine or counterfeit, the denomination of each banknote, and whether each banknote is fit or unfit. Simultaneously, the recognition unit 214 counts the banknotes. When the depositing and dispensing machine 1 is configured to be able to handle currencies of different countries, the recognition unit 214 is configured to be able to recognize the kinds of each of the currencies.

The escrow unit 215 temporarily retains the banknotes which are recognized by the recognition unit 214, and are transported to the escrow unit. The escrow unit 215 can be considered as part of the inner storage unit because the escrow unit stores the banknotes. The banknotes temporarily retained in the escrow unit 215 are stored in the inner storage unit 3, or returned to the inlet according to the operation performed by the teller as described below. The escrow unit 215 in this apparatus is a so-called tape winding stacker. The tape winding stacker is configured to store the banknotes by winding two tapes 217 sandwiching the fed banknotes on a rotation reel 218, and to feed the banknotes by rewinding the rotation drum 218. The tape winding stacker used as the escrow unit 215 may be replaced with a stacker of a different type capable of storing and feeding the banknotes. In the present embodiment, the escrow unit 215 is configured to be able to contain about 200-400 banknotes. However, the capacity of the escrow unit 215 is not limited thereto.

The inner storage unit 3 includes a single cassette 30, and first to fourth stackers 31-34. The number of the cassette and stackers is not limited thereto. The number of the cassette and stackers in the inner storage unit 3 can optionally be selected. In the present embodiment, each of the stackers 31-34 is configured to be able to contain about 1000-2000 banknotes. However, the capacity of the stackers is not limited thereto.

The safe unit 11*b* has an open front surface, and an open/close door is attached to the open front surface. Although not shown, the cassette 30 and the stackers 31-34 of the inner storage unit 3 are configured to be drawn forward when the door is opened. Thus, the banknotes stored in the inner storage unit 3 are unremovable directly from the outside of the casing 11.

The cassette 30 can store and feed the banknotes, and is detachably attached to the inner storage unit 3 to be positioned forwardmost in the direction of the depth of the apparatus. The cassette 30 stores overflowed banknotes which cannot be stored in the first to fourth stackers 31-34 which have become full, unfit banknotes which are recognized by the recognition unit 214 as those which can be deposited, but cannot be dispensed because of their stains or tears, and rejected banknotes which cannot be dispensed because they cannot be recognized by the recognition unit 214 in the dispensing, etc. Currencies of different countries can be stored in the cassette 30. In refilling the depositing and dispensing machine 1 with the banknotes, additional banknotes are placed in the cassette 30, and the cassette is attached to the depositing and dispensing machine 1. The banknotes in the cassette 30 are transported to the stackers 31-34, and are stored therein. In collecting the banknotes from the depositing and dispensing machine 1, the banknotes stored in the stackers 31-34 are stored in the cassette 30, and the cassette is removed from the depositing and dispensing machine 1.

The first to fourth stackers 31-34 can store and feed the banknotes, respectively, and are arranged from the front to the rear behind the cassette 30 in the depth direction of the apparatus. For example, the first to fourth stackers 31-34 store the banknotes of different denominations, respectively.

The transport unit 4 includes a looped transport path 41 which is looped in the casing 11. The banknotes are transported in the looped transport path 41 in the forward direction (a clockwise direction in FIG. 3), and in the reverse direction (a counterclockwise direction in FIG. 3).

The recognition unit 214 is provided in the looped transport path 41. The above-described units 211, 213, 215, and 3 except for the recognition unit 214 are connected to the looped transport path 41 to be diverted therefrom. Specifically, the depositing unit 211 is connected to the looped transport path 41 through a deposit transport path 42, the dispensing unit 213 is connected to the looped transport path 41 through a dispense transport path 43, and the escrow unit 215 is connected to the looped transport path 41 through an escrow transport path 44. The cassette 30 of the inner storage unit is connected to the looped transport path 41 through a cassette transport path 45 and a reject transport path 46. The first to fourth stackers 31-34 are connected to the looped transport path 41 through first to fourth stacker transport paths 471-474, respectively.

Diverters 48*a*, 48*b* are arranged at diversion points between the looped transport path 41 and the transport paths diverted from the looped transport path 41. The diverter 48*a* can sort the banknotes transported from a single transport path to be transported in two directions. The diverter 48*b* can sort the banknotes transported from a plurality of transport paths to be transported in two directions (see, e.g., Japanese Patent No. 274225). According to the depositing or dispensing performed by the depositing and dispensing machine 1, the controller 25 controls the diverters 48*a*, 48*b*, thereby sorting the banknotes in the suitable transport directions. Details of the diversion will be described below.

A first transport path 49 and a second transport path 410 connected to the stacking unit 5 are connected to parts of the looped transport path 41 forward and rearward of the recognition unit 214, respectively, to be diverted from the looped transport path 41. The diverters 48*a* are provided at the diversion points.

The structure of the transport unit 4 is not limited to the above structure, and various types of structures can be used.

Figure 3:
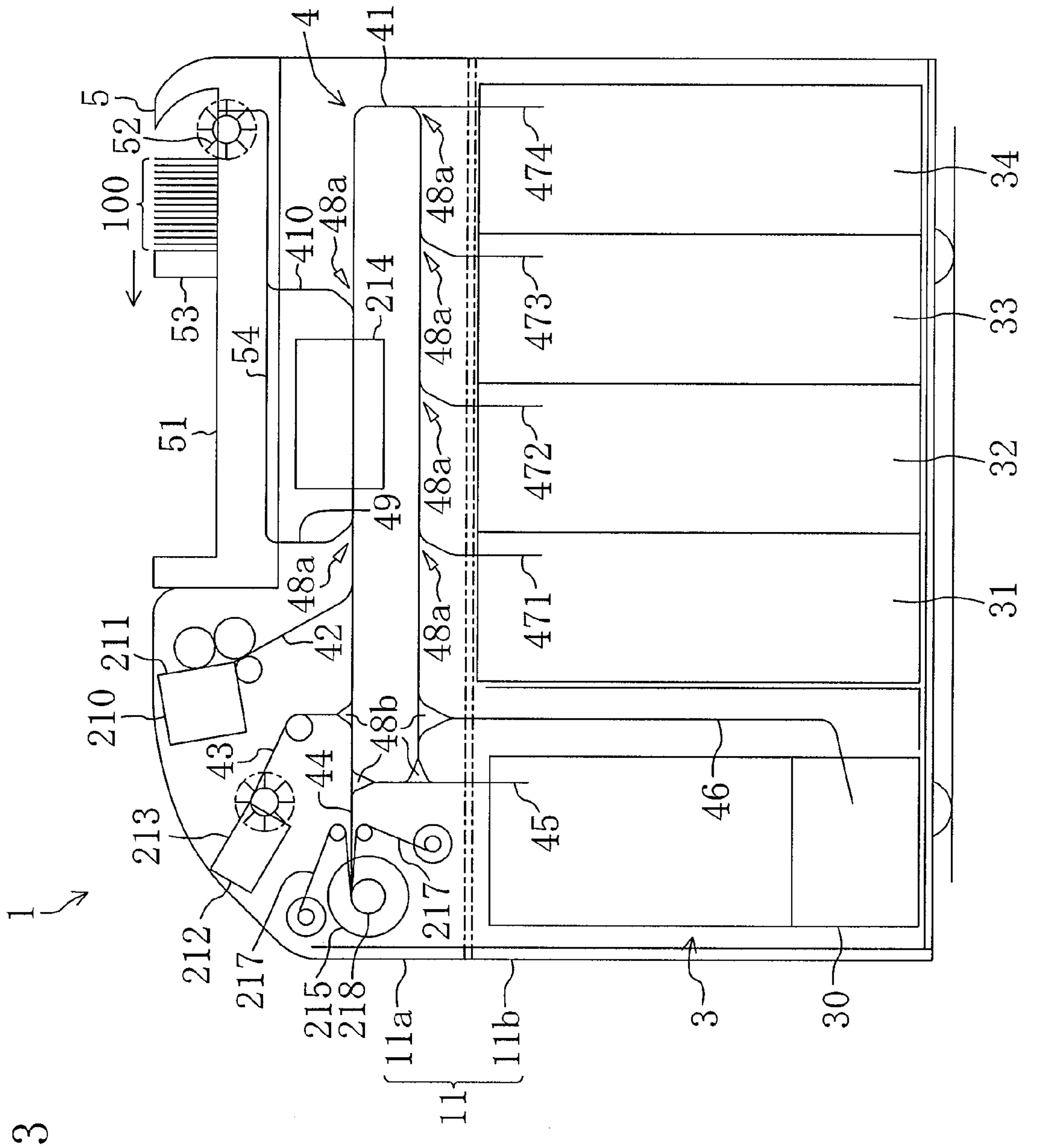
FIG. 3 is a schematic view illustrating the inner structure of the depositing and dispensing machine.
Figure 4:
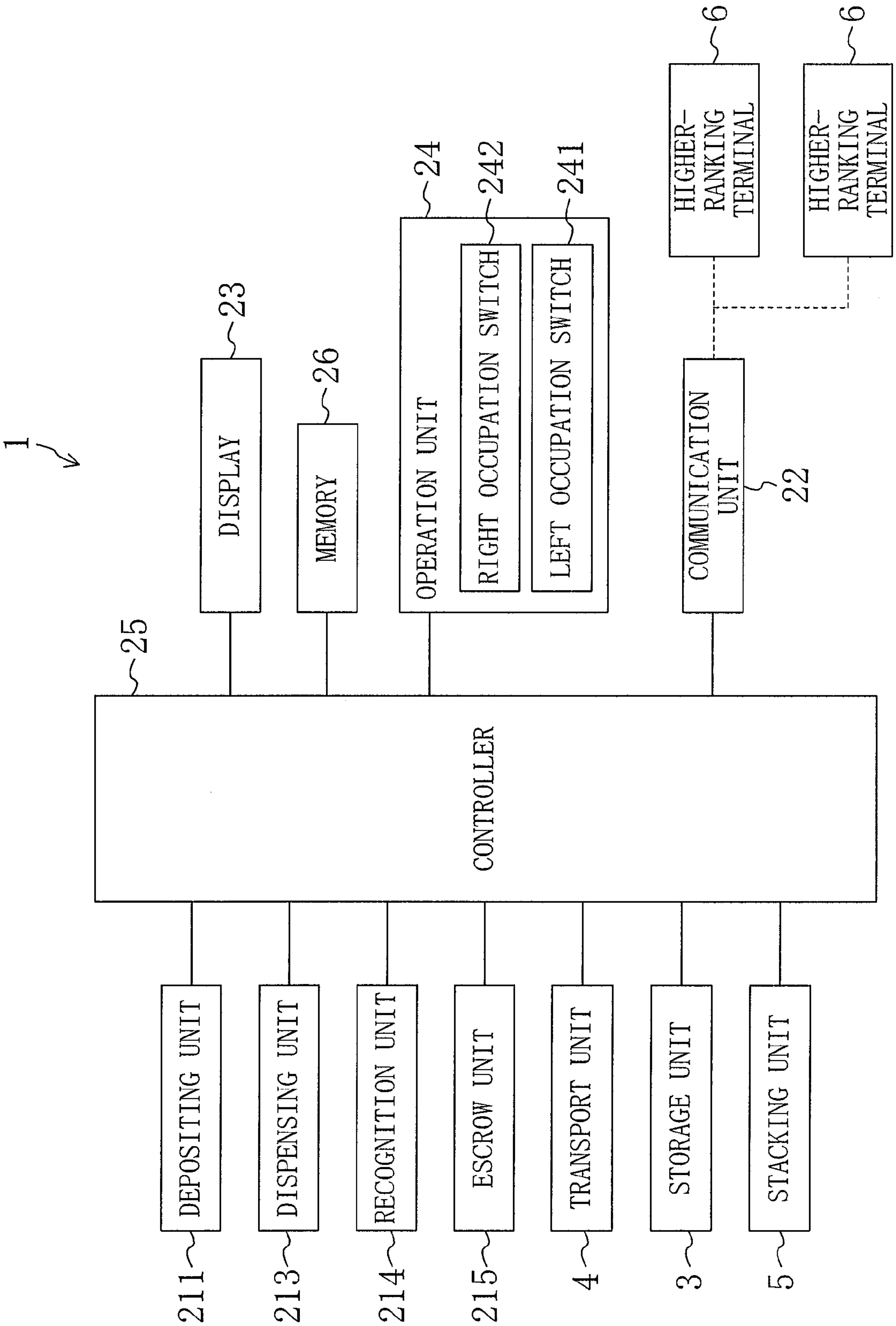
FIG. 4 is a block diagram illustrating the structure associated with control of the depositing and dispensing machine.

As described above, the stacking unit 5 is a unit configured to be attachable to the upper surface of the casing 11. The stacking unit 5 includes a stacking recess 51 extending in the depth direction of the machine. As shown in FIG. 3, the banknotes 100 are stacked in the stacking recess 51 to be aligned in the depth direction of the casing 11. In the stacking recess 51, the stacked banknotes are exposed outside the casing 11. Thus, unlike the banknotes stored in the inner storage unit 3, the stacked banknotes can easily be removed directly from the outside of the casing 11 without opening the casing 11 (the safe unit 11*b*). That is, the inner storage unit 3 and the escrow unit 215 are closed stackers, while the stacking unit 5 is an open stacker.

The stacking recess 51 of the stacking unit 5 is relatively long in the depth direction. In the present embodiment, the stacking unit 5 is configured to be able to contain about 500-1000 banknotes. Thus, the capacity of the stacking unit 5 is larger than the capacities of the depositing unit 211 and the dispensing unit 213.

An outlet through which the banknotes are dispensed is formed in a rearmost portion of the stacking recess 51 (a right portion in FIG. 3), and stacking wheels 52 which tap the banknotes dispensed through the outlet are provided in the outlet. A guide plate 53 which is movable in a direction in which the banknotes are stacked (in the depth direction) is attached to the stacking recess 51, and a guiding belt (not shown) is, provided on the bottom of the stacking recess. As schematically shown in FIG. 3, the banknotes 100 dispensed to the stacking recess 51 through the outlet are aligned from the rear to the front of the stacking recess while supported by the guiding belt, and a guiding plate 53 which moves appropriately with the guiding belt (see an arrow shown in FIG. 3).

As shown in FIG. 3, an in-unit transport path 54 configured to transport the banknotes is provided in the stacking unit 5. An end of the in-unit transport path 54 is an opening constituting the outlet, and the other end is a connection end which is connected to the first transport path 49 and the second transport path 410 when the stacking unit 5 is attached to the casing 11.

When the transport path is not provided in the stacking unit 5, but is provided in the casing 11, and the stacking unit 5 is attached to the casing 11, the outlet may be connected to the transport path of the casing.

Operations of the above-described depositing and dispensing machine 1 will be described below. When the respective units are controlled by the controller 25, the depositing and dispensing machine 1 performs at least depositing of the banknotes, dispensing of the banknotes, refilling the inner storage unit 3 with the banknotes, and collecting the banknotes from the inner storage unit 3. Among them, the depositing and the dispensing have two modes, i.e., a normal handling mode, and a bulk handling mode. The normal handling mode is selected when the number of banknotes deposited or dispensed is relatively small, and the bulk handling mode is selected when the number of banknotes deposited or dispensed is relatively large. For example, the bulk handling mode is a mode for handling more banknotes than those storable in the escrow unit 215 or the dispensing unit 213. The normal handling mode is a mode for handling fewer banknotes than those storable in the escrow unit 215 or the dispensing unit 213. The bulk handling mode may be employed to sort the banknotes of a certain kind. Selection of the depositing, the dispensing, the refilling, or the collecting, or selection of the normal handling mode or the bulk handling mode can be done based on an operation designating signal or a selection signal input from the higher-ranking terminal 6 to the depositing and dispensing machine 1 by operating the higher-ranking terminal 6.

Figure 5:
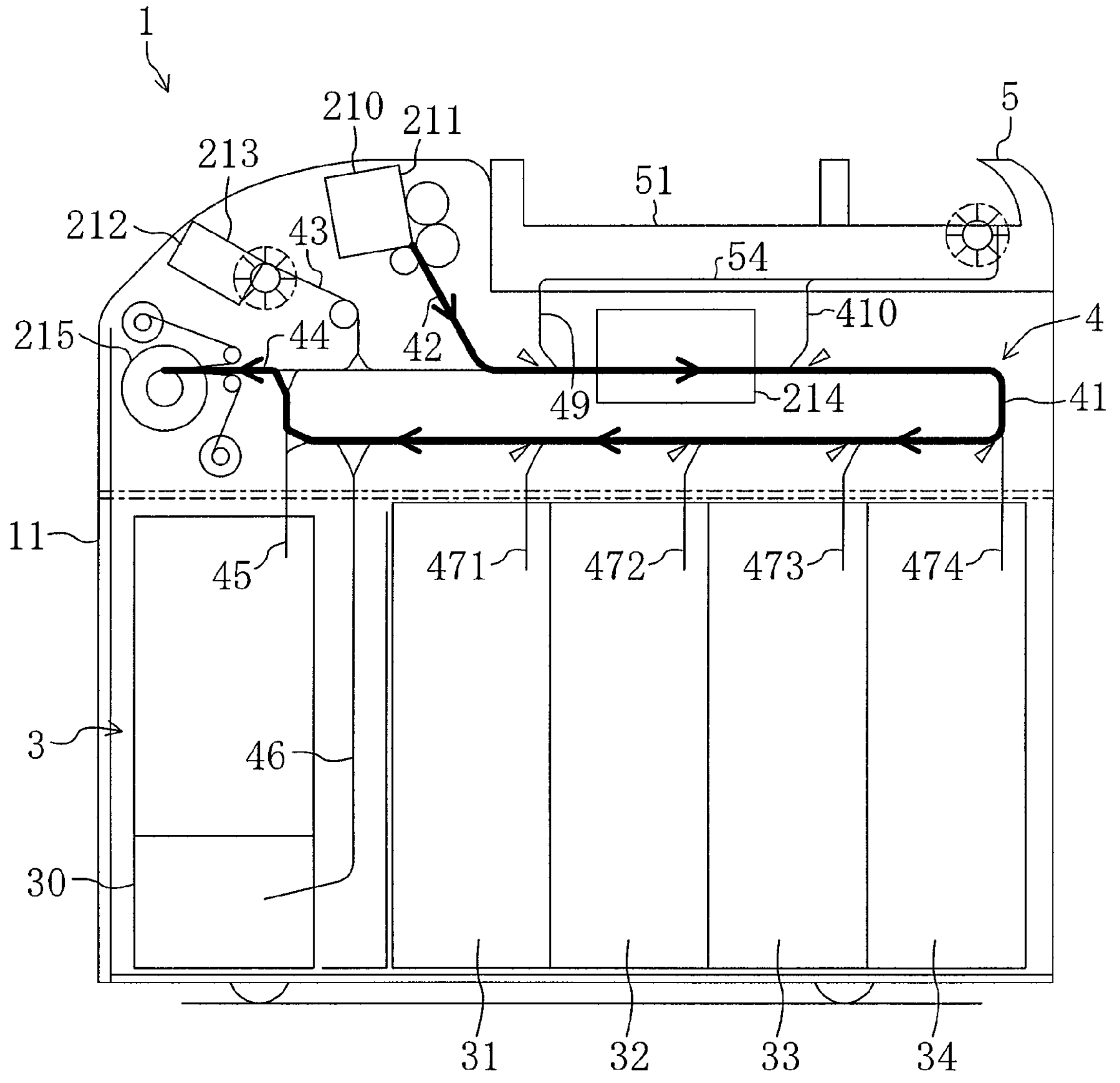
FIG. 5 is a view illustrating a transport path of banknotes deposited in a normal handling mode (a first deposit mode).

Referring to FIG. 5, the depositing in the normal handling mode (a first deposit mode) will be described below. In the depositing, the banknotes introduced in the inlet 210 are fed one by one, pass through the deposit transport path 42, and travel through the looped transport path 41 in the forward direction to reach the recognition unit 214. The recognition unit 214 recognizes and counts the banknotes. Based on the recognition result, the banknotes which can be deposited travel through the looped transport path 41 in the forward direction as indicated by arrows in FIG. 5 to reach the escrow unit 215 through the escrow transport path 44. Although not shown, the banknotes which cannot be deposited are transported from the looped transport path 41 to the outlet 212 through the dispense transport path 43, or to the cassette 30 through the reject transport path 46.

After all the banknotes are fed from the inlet 210 (after the banknotes rejected to the outlet 212 are introduced and fed again), the count of the banknotes is displayed on the higher-ranking terminal 6, and an operation for confirming the deposit of the banknotes is performed by operating the higher-ranking terminal 6. Then, although not shown, the banknotes temporarily retained in the escrow unit 215 are fed. The fed banknotes travel through the looped transport path 41 in the forward direction, and pass through the first to fourth stacker paths 471-474 to be stored in the first and fourth stackers 31-34, while the banknotes are sorted by denomination. In place of using the escrow unit 215, the banknotes may directly be stored in the first to fourth stackers 31-34. In this case, the operation for confirming the deposit of the banknotes is not necessary.

In the depositing in the bulk handling mode (a second deposit mode), the banknotes introduced in the inlet 210 are fed one by one, and are transported to the recognition unit 214 through the deposit transport path 42 and the looped transport path 41. This is the same as the normal handling mode. Then, the recognition unit 214 recognizes and counts the banknotes.

Figure 6:
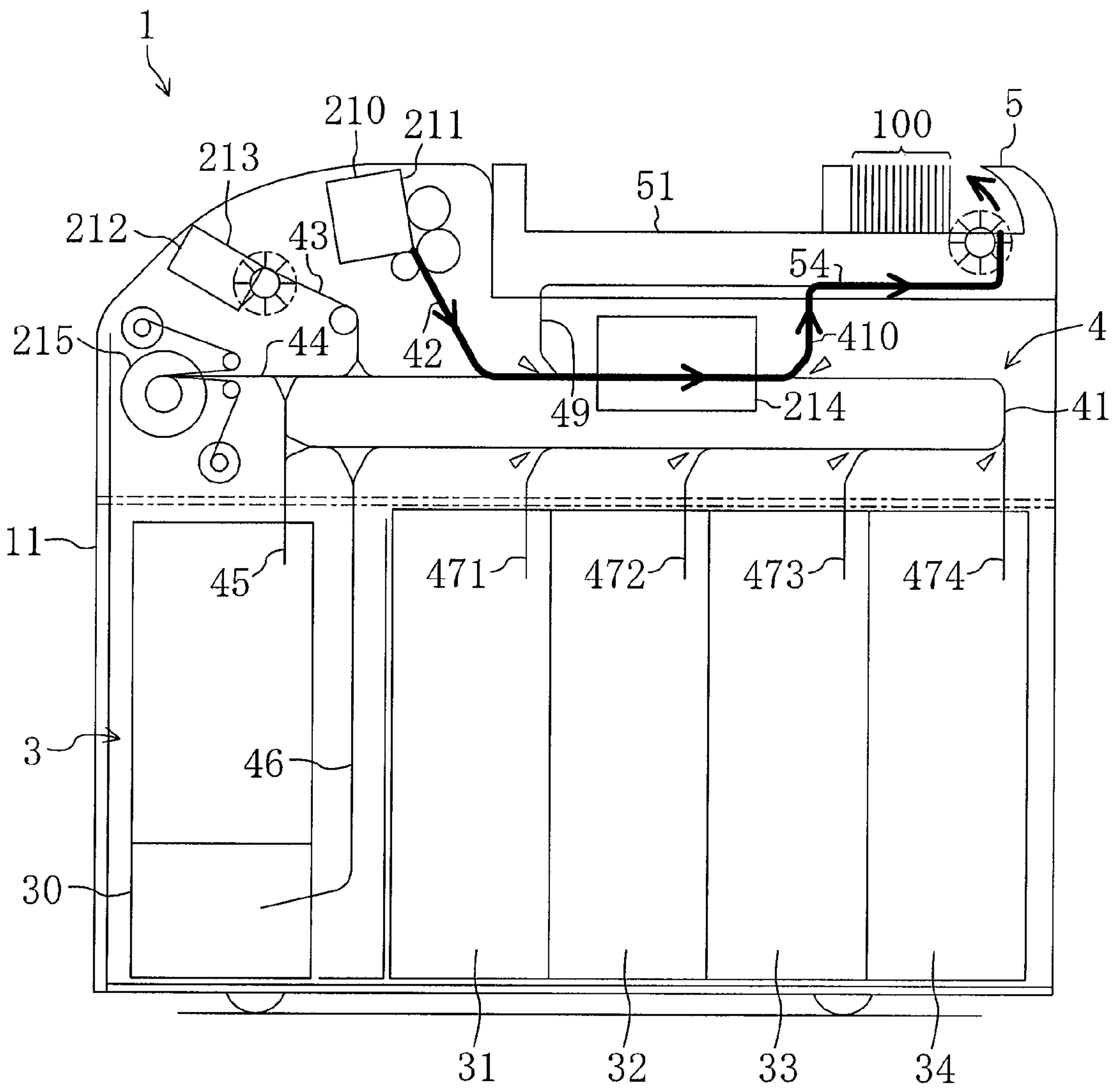
FIG. 6 is a view illustrating a transport path of the banknotes deposited in a bulk handling mode (a second deposit mode).

In the bulk handling mode, the banknotes which can be deposited are transported from the looped transport path 41 to the stacking unit 5 through the second transport path 410 and the in-unit transport path 54 as indicated by arrows in FIG. 6, and are stacked in the stacking recess 51. As described above, the capacity of the stacking unit 5 is relatively large. Therefore, in depositing a large amount of banknotes, the stacking recess 51 does not become full, and the depositing is not interrupted.

Further, as described above, the banknotes stacked in the stacking recess 51 can easily be removed directly from the outside of the casing 11. Thus, for example, even when the number of banknotes handled in the bulk handling mode exceeds the number of banknotes stackable in the stacking recess 51, the depositing will continue without interruption when the teller removes the banknotes stacked in the stacking recess 51 before the stacking recess 51 becomes full. Even when the stacking recess 51 becomes full, the depositing can easily be restarted when the teller removes the stacked banknotes.

Thus, in the depositing and dispensing machine 1, even when a large amount of banknotes are deposited at a time, increase in time for the depositing can be reduced, thereby increasing efficiency of the depositing. This can improve the efficiency of transactions at teller's windows, and can shorten customers' waiting time.

Further, it is no longer necessary to increase the size of the escrow unit 215 in the casing 11, thereby keeping the size of the depositing and dispensing machine 1 small. This is advantageous for the depositing and dispensing machine 1 placed in the teller counter. In addition, complication of the apparatus associated with the increase in capacity of the escrow unit 215 can be prevented, thereby reducing costs of the depositing and dispensing machine 1.

When all the banknotes introduced in the inlet 210 are fed, the count of the banknotes is displayed on the higher-ranking terminal 6, and the operation for confirming the deposit of the banknotes, for example, is performed. In the bulk handling mode, the banknotes are removed from the stacking recess 51, and are stored in, for example, a safe different from the depositing and dispensing machine 1.

In the bulk handling mode, although not shown, the banknotes which are recognized by the recognition unit 214 as those which cannot be deposited are transported from the looped transport path 41 to the outlet 212 through the dispense transport path 43, or to the cassette 30 through the reject transport path 46. This is the same as the normal handling mode.

The two modes are referred to as the "bulk handling mode," and the "normal handling mode," but these are merely examples. The depositing configured to stack the banknotes in the outer stacking unit 5 is not limited to handling of a large amount of banknotes at a time.

As an example of the depositing of the banknotes when a predetermined kind of the banknotes is designated, depositing of the banknotes when a predetermined denomination is designated will be described with reference to FIG. 7. In this depositing, the banknotes introduced in the inlet 210 are fed one by one, and are transported to the recognition unit 214 through the deposit transport path 42 and the looped transport path 41. The recognition unit 214 recognizes and counts the banknotes.

Figure 7:
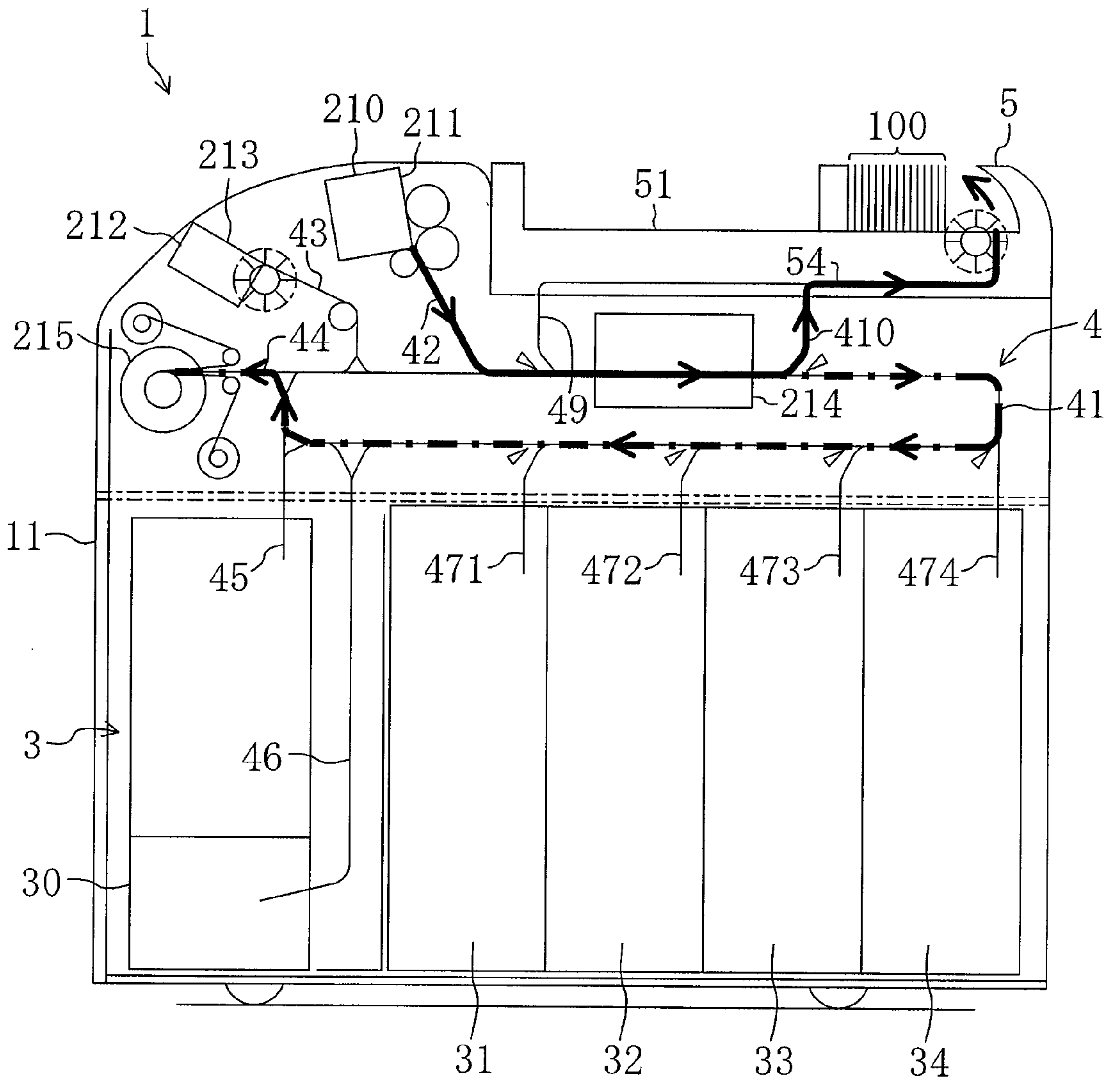
FIG. 7 is a view illustrating a transport path of the banknotes deposited when denominations of the banknotes are designated.

Based on the recognition result of the recognition unit 214, the banknotes of the designated denomination are transported from the looped transport path 41 to the stacking unit 5 through the second transport path 410 as indicated by solid arrows in FIG. 7. Thus, the banknotes of the designated denomination are stacked in the stacking recess 51.

The banknotes of the denominations except for the designated denomination are transported from the looped transport path 41 to the escrow unit 215 through the escrow transport path 44 as indicated by dot-dash arrows in FIG. 7.

When all the banknotes are fed from the inlet 210, the count of the banknotes is displayed on the higher-ranking terminal 6. When the higher-ranking terminal 6 is operated to confirm the deposit of the banknotes, although not shown, the banknotes temporarily retained in the escrow unit 215 are fed to be stored in the first to forth stackers 31-34, while the banknotes are sorted by denomination as described above. The banknotes stacked in the stacking recess 51 are removed by the teller, and are stored in a safe different from the depositing and dispensing machine 1.

Designating the denomination is particularly advantageous when the number of the banknotes to be deposited exceeds the number of the banknotes which can be stored in the escrow unit 215. Specifically, when a large amount of banknotes is deposited at a time, and the number of the banknotes of a particular denomination is larger than the number of the banknotes of the other denominations, only the banknotes of the particular denomination are stacked in the stacking unit 5. Thus, the escrow unit 215 does not become full, and the efficiency of the depositing improves. Simultaneously, the banknotes are conveniently sorted by denomination. For example, in selecting the bulk handling mode through the higher-ranking terminal 6, the denomination of the banknotes to be stacked in the stacking unit 5 may optionally be designated. The denomination can be designated also in the normal handling mode.

In performing the depositing, the selection of the normal handling mode or the bulk handling mode, or the designation of the denomination of the banknotes to be stacked in the stacking unit 5 can be performed by operating the higher-ranking terminal 6. The teller can suitably determine which handling mode should be selected after checking the amount of the banknotes to be deposited. In place of designating the denomination of the banknotes to be stacked in the stacking unit 5, the denomination of the banknotes to be stored in the inner storage unit 3 may be designated.

For example, when the normal handling mode is selected, and the escrow unit 215 becomes full while the banknotes are sequentially fed to the escrow unit 215 to be temporarily retained therein, the rest of the banknotes may be transported to the stacking unit 5 in place of the escrow unit 215. Specifically, when the depositing is being performed, the normal handling mode may automatically be changed to the bulk handling mode. Thus, even when the escrow unit 215 becomes full, the depositing can continue without interruption. This advantageously improves the efficiency of the depositing. When the normal handling mode is changed to the bulk handling mode, the temporarily retained banknotes are fed from the escrow unit 215 to be stacked in the stacking recess 51 after all the banknotes in the inlet 210 are fed. Specifically, all the banknotes to be deposited may be stacked in the stacking recess 51.

For example, in the depositing and dispensing machine which does not include the escrow unit 215, whether the deposited banknotes are directly transported to the first to fourth stackers 31-34, or are stacked in the stacking unit 5 may be selected. Thus, the selection of the normal handling mode or the bulk handling mode, and the designation of the denomination of the banknotes to be stacked in the stacking unit 5 can be performed in the same manner as in the depositing and dispensing machine including the escrow unit 215.

The capacity of the stacking unit 5 is preferably twice or more as large as the capacity of the depositing unit 211. Thus, the banknotes at least twice as many as the banknotes which can be deposited in the depositing unit at a time can all be stacked in the stacking unit 5. This can reduce the frequency of the removal of the banknotes from the stacking unit 5, thereby saving time and labor of the teller.

The capacity of the stacking unit 5 is preferably twice or more as large as the capacity of the escrow unit 215. Thus, the banknotes at least twice as many as the banknotes which can be temporarily retained in the escrow unit at a time can all be stacked in the stacking unit 5, although depositing of such a large amount of banknotes involves storing a set of the banknotes which filled the escrow unit in the storage part, and retaining another set of the banknotes in the escrow unit, if the capacity of the stacking unit 5 is not twice or more as large as the capacity of the escrow unit. This can save time required for the storing of the banknotes in the storage part, thereby reducing transaction time.

In the depositing described above, the memory 26*a* stores the deposit amount representing the respective numbers of the banknotes of different denominations deposited in the depositing and dispensing machine 1, the inner deposit amount representing the respective numbers of the banknotes of different denominations stored in the inner storage unit 3, and the outer deposit amount representing the respective numbers of the banknotes of different denominations stacked in the outer stacking unit 5. The inner deposit amount is added to the inventory amount, thereby updating the inventory amount. Information of the outer deposit amount is sent to the higher-ranking terminal 6 or a different higher-ranking device through the communication unit 22. The information can be sent every time when the depositing is performed, regularly, or when requested by the higher-ranking device. Both of the inner deposit amount and the outer deposit amount may be stored at any time. When the banknotes are not stored in the inner storage unit 3, or not stacked in the outer stacking unit 5, only the inner deposit amount of the inner storage unit 3, or the outer deposit amount of the outer stacking unit 5 to which the banknotes are transported may be stored in the memory.

Regarding the selection of the handling mode, and the designation of the denomination, for example, customer information including an account number, and setting information of the depositing and dispensing machine 1 may be associated with each other, and the associated information may be stored in a customer information database (not shown) to which the higher-ranking terminal 6 is connected. Thus, when the account number is input to the higher-ranking terminal 6, the selection of the handling mode and the designation of the denomination can automatically be performed based on the information stored in the database. For example, some customers may always deposit many banknotes, or always deposit many banknotes of a particular denomination due to their occupations. In such cases, the setting of the depositing and dispensing machine 1 can automatically be changed to the setting for customized depositing by merely inputting the account number. This significantly improves convenience.

The denomination of the banknotes has been described as the kind of the banknotes. However, the banknotes may be sorted by whether they are fit or unfit, or whether they are of national currency or foreign currency, etc. For example, when many of the deposited banknotes are unfit banknotes not suitable for the dispensing, or when many of the deposited banknotes are in foreign currency, such many banknotes may advantageously be designated.

A unit for identifying the customer is not limited to the account number input to the higher-ranking terminal 6. There are various known unit for identifying the customer, and they can be selected as appropriate. For example, the customer may be identified by reading a card possessed by the customer.

Figure 8:
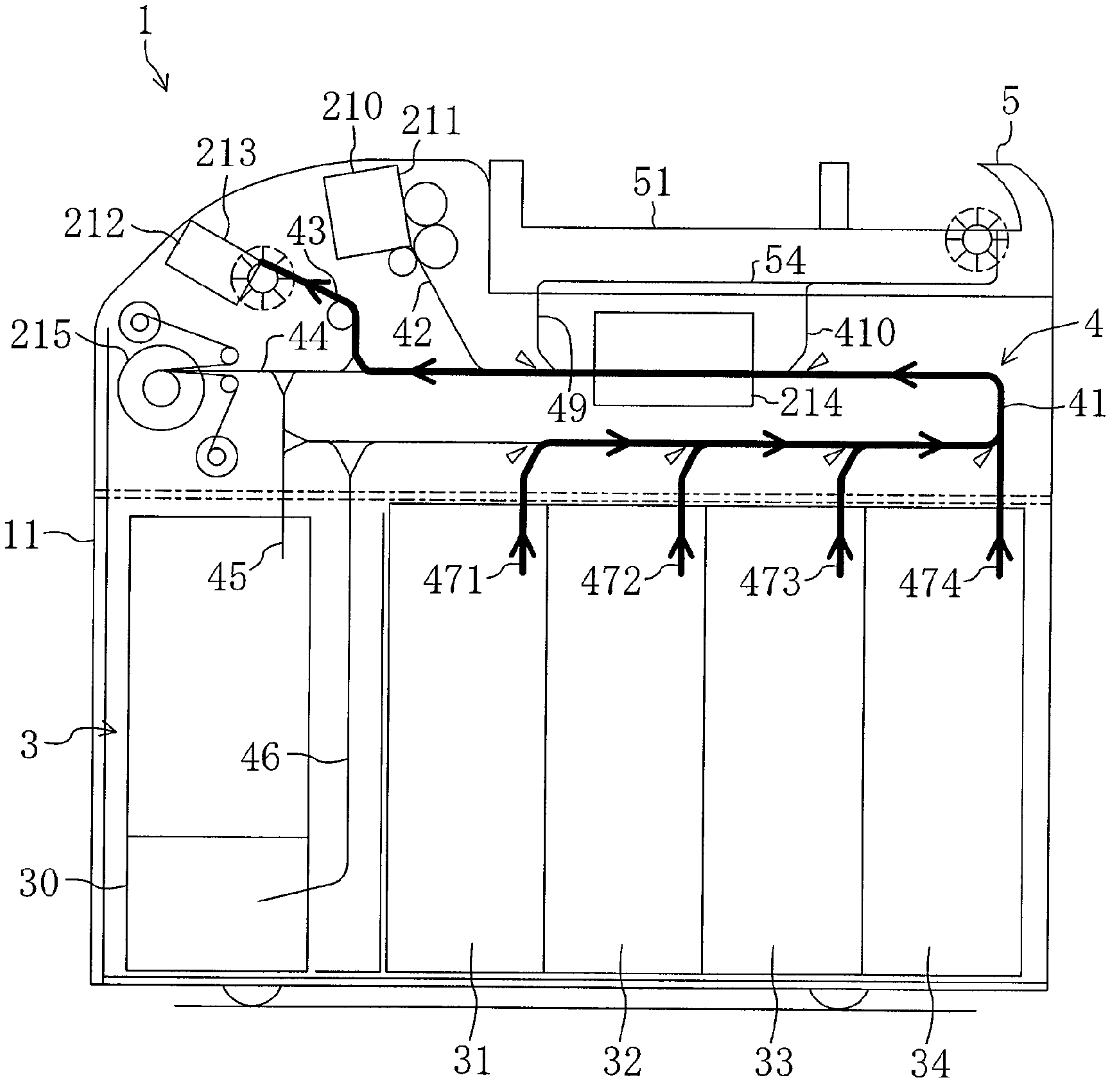
FIG. 8 is a view illustrating a transport path of the banknotes dispensed in a normal handling mode (a first dispense mode).

The dispensing in the normal handling mode (a first dispense mode) will be described below with reference to FIG. 8. In the dispensing, the banknotes stored in the inner storage unit 3 are fed, and travel through the looped transport path 41 in the reverse direction to reach the recognition unit 214. The banknotes handled by the recognition unit 214 are transported from the looped transport path 41 to the outlet 212 through the dispense transport path 43 (see arrows in FIG. 8).

Figure 9:
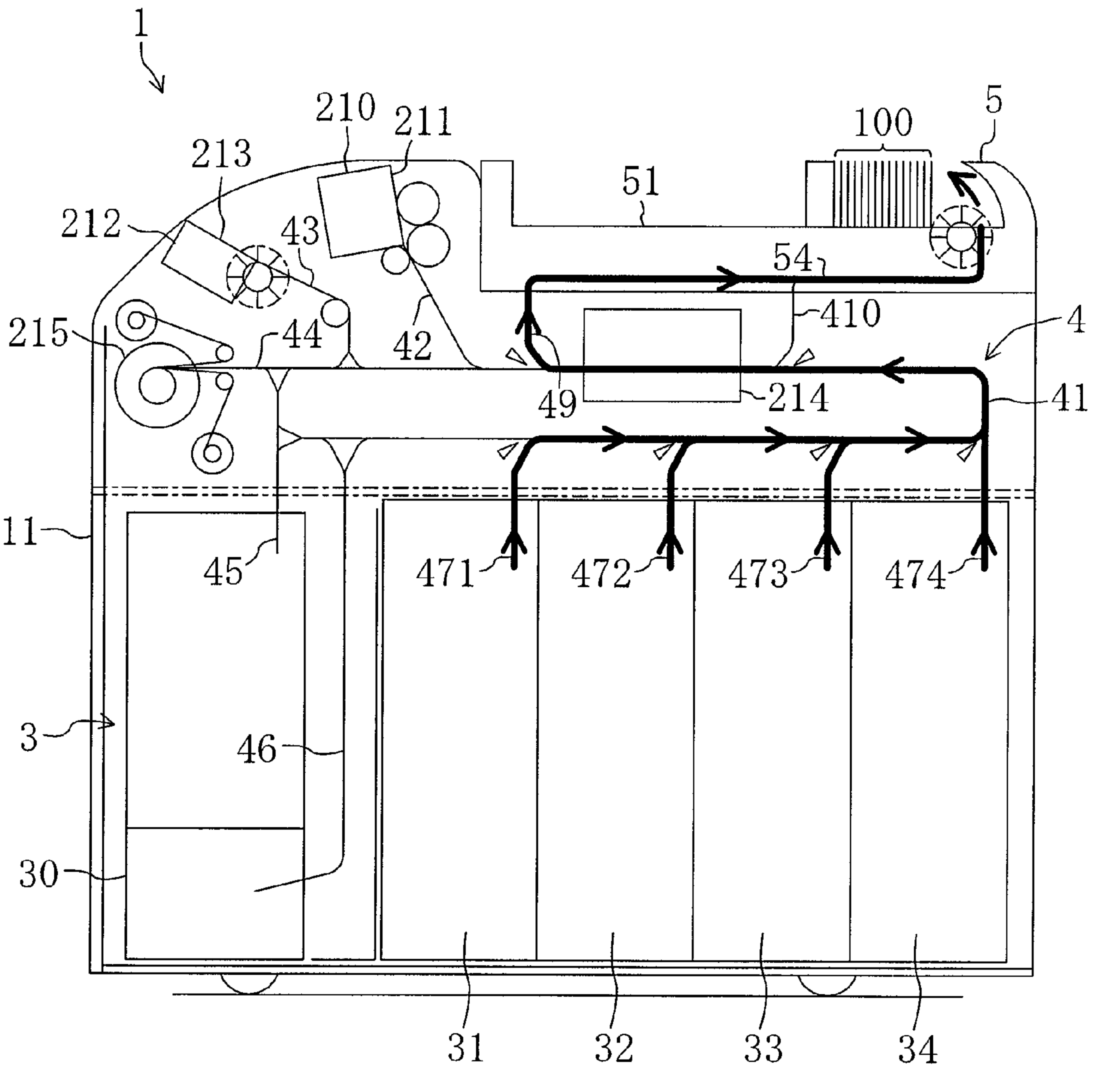
FIG. 9 is a view illustrating a transport path of the banknotes dispensed in a bulk handling mode (a second dispense mode).

In the dispensing in the bulk handling mode (a second dispense mode), as shown in FIG. 9, the banknotes fed from the inner storage unit 3 are handled by the recognition unit 214, are transported to the stacking unit 5 through the first transport path 49, and are stacked in the stacking recess 51. As described above, the capacity of the stacking unit 5 is larger than the capacity of the dispensing unit 213. Thus, even in dispensing more banknotes than those which can be stored in the dispensing unit 213, the stacking recess 51 does not become full, and the dispensing is not interrupted. Even when the banknotes handled in the bulk handling mode are more than the banknotes which can be stacked in the stacking recess 51, the dispensing can continue when the teller removes the banknotes stacked in the stacking recess 51 before the stacking recess 51 becomes full. Even when the stacking recess 51 has become full, the dispensing can easily be restarted when the teller removes the stacked banknotes.

The capacity of the stacking unit 5 is preferably twice or more as large as the capacity of the dispensing unit 213. Thus, the banknotes, which are many, and have to be removed from the dispensing unit 213 at at least two times, can all be removed from the stacking unit 5 at a time.

In this depositing and dispensing machine 1, time required for the dispensing is less likely to increase even when a large amount of banknotes are dispensed at a time, thereby improving efficiency of the dispensing.

Although not shown, when a predetermined denomination is designated in the dispensing, some of the banknotes of the designated denomination are transported to the stacking unit 5 through the first transport path 49 after being handled by the recognition unit 214, while the banknotes of the other denominations are transported to the dispensing unit 213 through the dispense transport path 43. Thus, in the dispensing, for example, the banknotes can be sorted by denomination, and a large amount of the banknotes of the designated denomination can be dispensed with improved efficiency. The denomination of the banknotes to be transported to the dispensing unit 213 can also be designated.

In the dispensing, the amount of the banknotes to be dispensed is determined by operating the higher-ranking terminal 6, or if necessary, the numbers of the banknotes of different denominations are determined by operating the higher-ranking terminal 6. Thus, the number of the banknotes to be dispensed is determined in advance. Therefore, the selection of the normal handling mode or the bulk handling mode, and the designation of the denomination of the banknotes to be stacked in the stacking unit 5 are not performed based on the operation for selection or designation through the higher-ranking terminal 6, but can automatically be performed based on the amount of the banknotes to be dispensed, or the designated numbers of the banknotes of different denominations.

When the above-described dispensing is performed, the numbers of the banknotes of the different denominations are subtracted from the inventory amount, thereby updating the inventory amount.

The denomination of the banknotes has been described as the kind of the banknotes. However, the banknotes may be sorted by whether they are fit or unfit, or whether they are of national currency or foreign currency, etc. For example, this is effective for dispensing or collecting the banknotes sorted by kind, i.e., whether they are fit or unfit, or whether they are of national currency or foreign currency, from the dispensing unit 213 or the outer stacking unit 5.

In the depositing and dispensing machine 1, the depositing unit 211 and the dispensing unit 213 are not limited to separate units. The depositing unit 211 and the dispensing unit 213 may be a single port as a depositing/dispensing unit.

(Variations)

In the above-described structure, the outer stacking unit 5 is configured as the stacking unit 5 which is retrofitted to the casing 11. This structure is advantageous because the stacking unit 5 can be retrofitted to the depositing and dispensing machine 1 as needed according to change of the target to be handled, or the customer's request. However, the outer stacking unit 5 is not necessarily configured to be retrofitted to the casing. That is, the outer stacking unit 5 may be configured to be inseparable from the casing 11.

The structure of the outer stacking unit is not limited to the above-described structure, and various types of structures can be employed. A different structure of the outer stacking unit will be described below with reference to the drawings.

Figure 10:
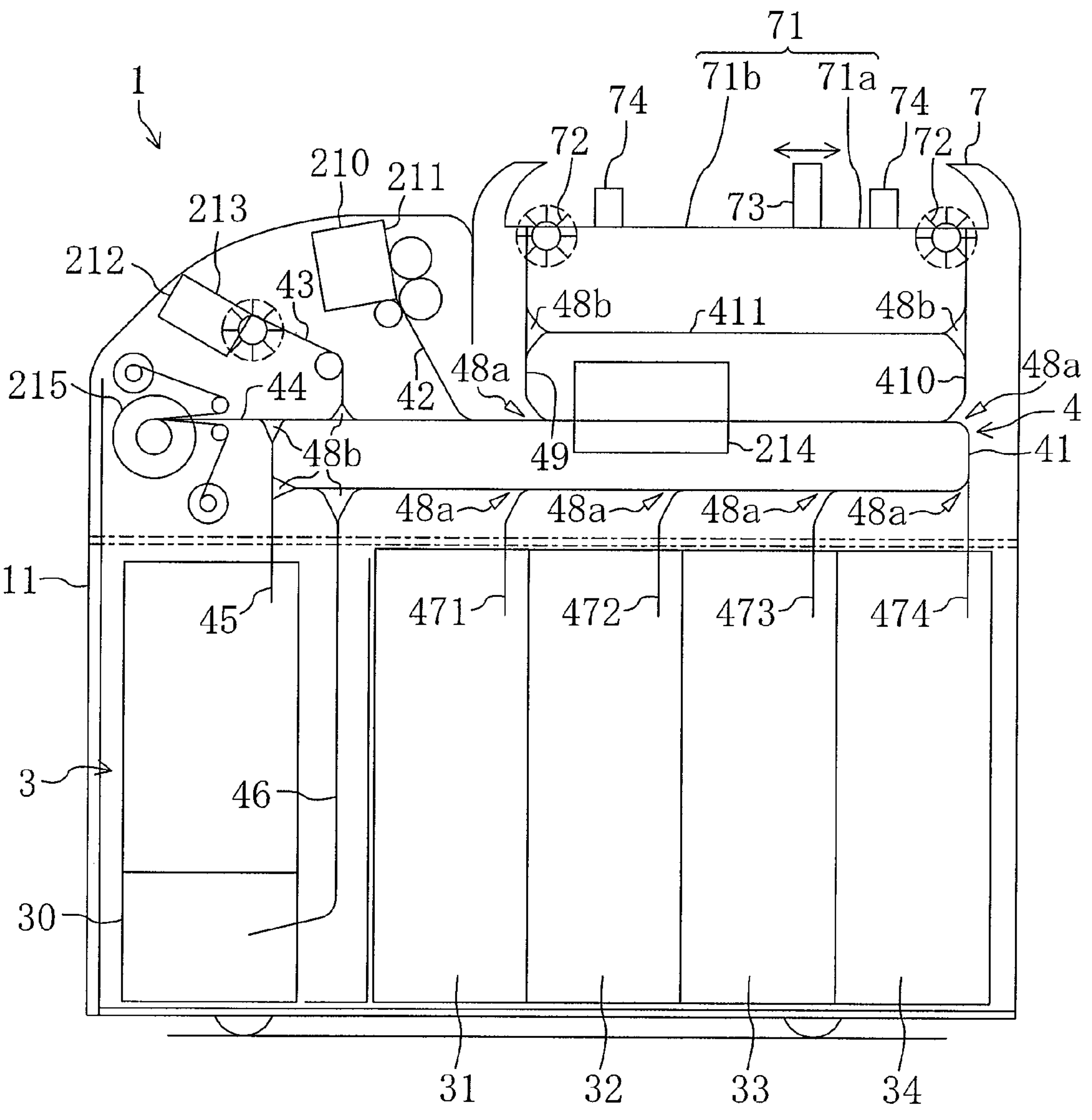
FIG. 10 is a schematic view illustrating another structure of the depositing and dispensing machine.

FIG. 10 shows a stacking recess 71 of an outer stacking unit 7, which is divided into two regions, i.e., a rearward region 71*a*, and a forward region 71*b*, by a divider 73. In FIG. 10, the outer stacking unit 7 is inseparable from the casing 11. However, the outer stacking unit 7 may be configured as a stacking unit which can be retrofitted to the casing 11.

In the outer stacking unit 7, outlets through each of which the banknotes are dispensed are formed in a rear end of the stacking recess 71 (a right end in FIG. 10), and a front end of the stacking recess 71 (a left end in FIG. 10), respectively, and stacking wheels 72 which tap the banknotes dispensed through the outlets are provided in the outlets. In each of the rearward region 71*a* and the forward region 71*b*, guide plates 74 configured to support the banknotes are attached to be movable in the stacking direction of the banknotes.

The divider 73 is configured to be automatically or manually movable in the stacking direction (in the depth direction) in the stacking recess 71. Changing the position of the divider 73 can change the capacity ratio between the rearward region 71*a* and the forward region 71*b*.

A first transport path 49 is connected to the front outlet of the outer stacking unit 7, and a second transport path 410 is connected to the rear outlet of the outer stacking unit 7. The first and second transport paths 49, 410 are coupled to each other through a coupling transport path 411 and diversion mechanisms 48*b*. With the transport paths configured in this manner, the banknotes traveling from the front of the recognition unit 214 to the outer stacking unit 7 can be fed to both of the rearward region 71*a* and the forward region 71*b*. Further, the banknotes traveling from the back of the recognition unit 214 to the outer stacking unit 7 can also be fed to both of the rearward region 71*a* and the forward region 71*b*.

With the multiple stacking regions provided in the outer stacking unit 7, the banknotes can be sorted in the depositing and the dispensing, for example, by denomination, whether they are fit or unfit, or currency (whether the banknotes are of national currency or foreign currency) in the outer stacking unit 7. This improves convenience.

In this structure, the depositing and dispensing machine 1 checks the position of the divider 73 to understand the capacity ratio between the stacking regions, and performs the control according to the capacity ratio. For example, the dispensing may be suspended when the banknotes may possibly exceed the capacities of the stacking regions. When one of the stacking regions is likely to become full during the dispensing, the position of the divider 73 is automatically changed to change the capacity ratio to continue the dispensing.

As described above, the position of the divider 73 may be preset in association with the customer information. When the account number is input, the position of the divider 73 may automatically be changed, and the denomination of the banknotes to be stacked in the stacking regions may automatically be designated. The position of the divider 73 may also be changed based on the number of the banknotes to be dispensed.

Figure 11:
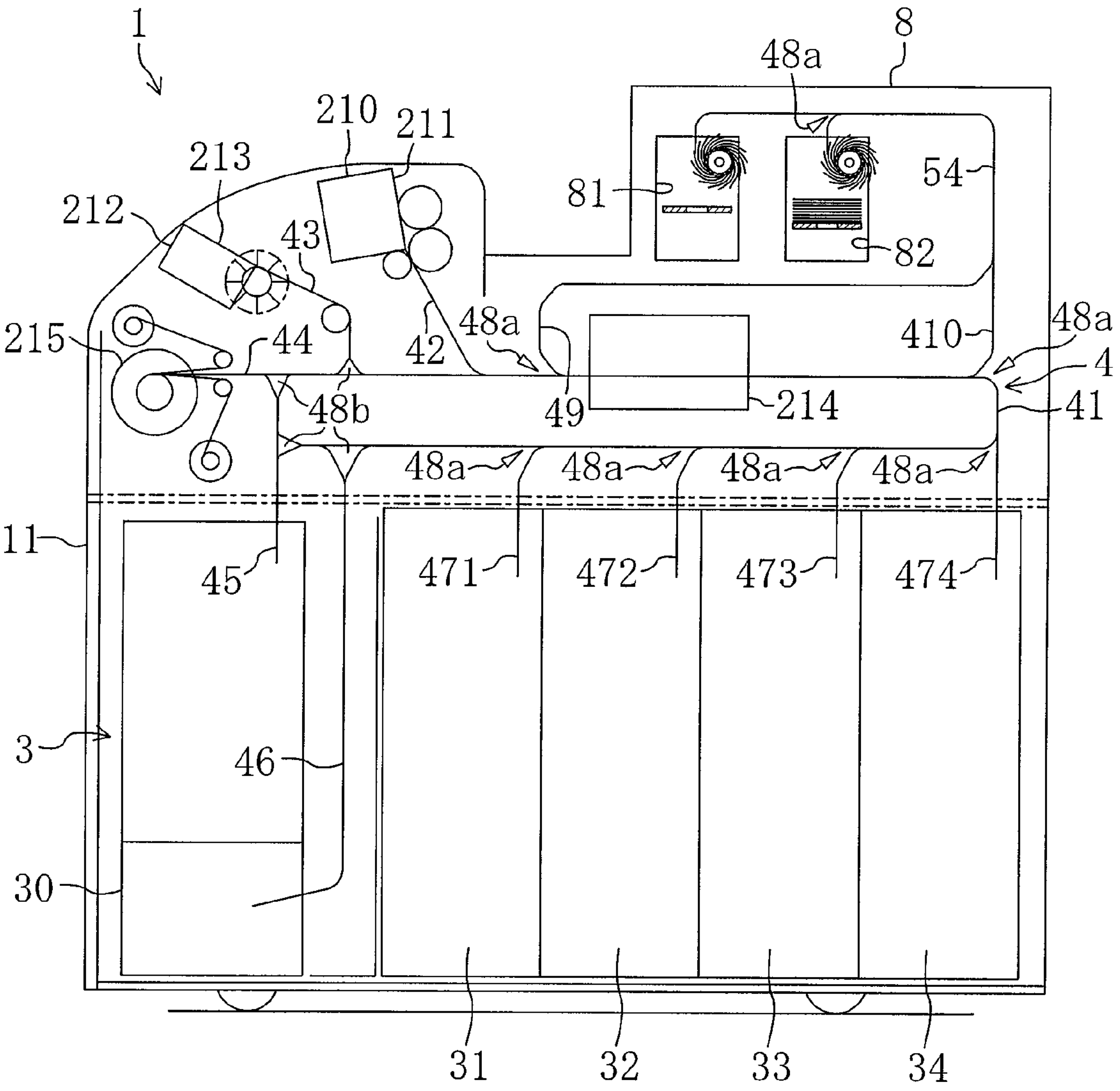
FIG. 11 is a schematic view illustrating still another structure of the depositing and dispensing machine.

FIG. 11 shows another different structure of the outer stacking unit. An outer stacking unit 8 includes two stacking regions 81 and 82 each of which stacks the banknotes in the vertical direction. The stacking regions 81, 82 have openings which are opened in the right and left sides of the casing 11, respectively. The tellers on the right and left sides of the depositing and dispensing machine 1 can remove the banknotes from the right and left openings (outlets). With the provision of the multiple stacking regions 81, 82, the banknotes can advantageously be sorted in the outer stacking unit as described above. Although the two stacking regions 81, 82 are provided in the illustrated example, the number of the stacking regions is not particularly limited.

In the above-described structures, speed at which the banknotes are transported in the normal handling mode, and speed at which the banknotes are transported in the bulk handling mode may be different from each other. For example, in the bulk handling mode, the recognized banknotes are merely transported to the outer stacking unit. Thus, the transport speed in the bulk handling mode may be higher than the transport speed in the normal handling mode. This is advantageous because time required for handling a large amount of banknotes in the bulk handling mode, which is originally long, can be reduced.

Figure 12:
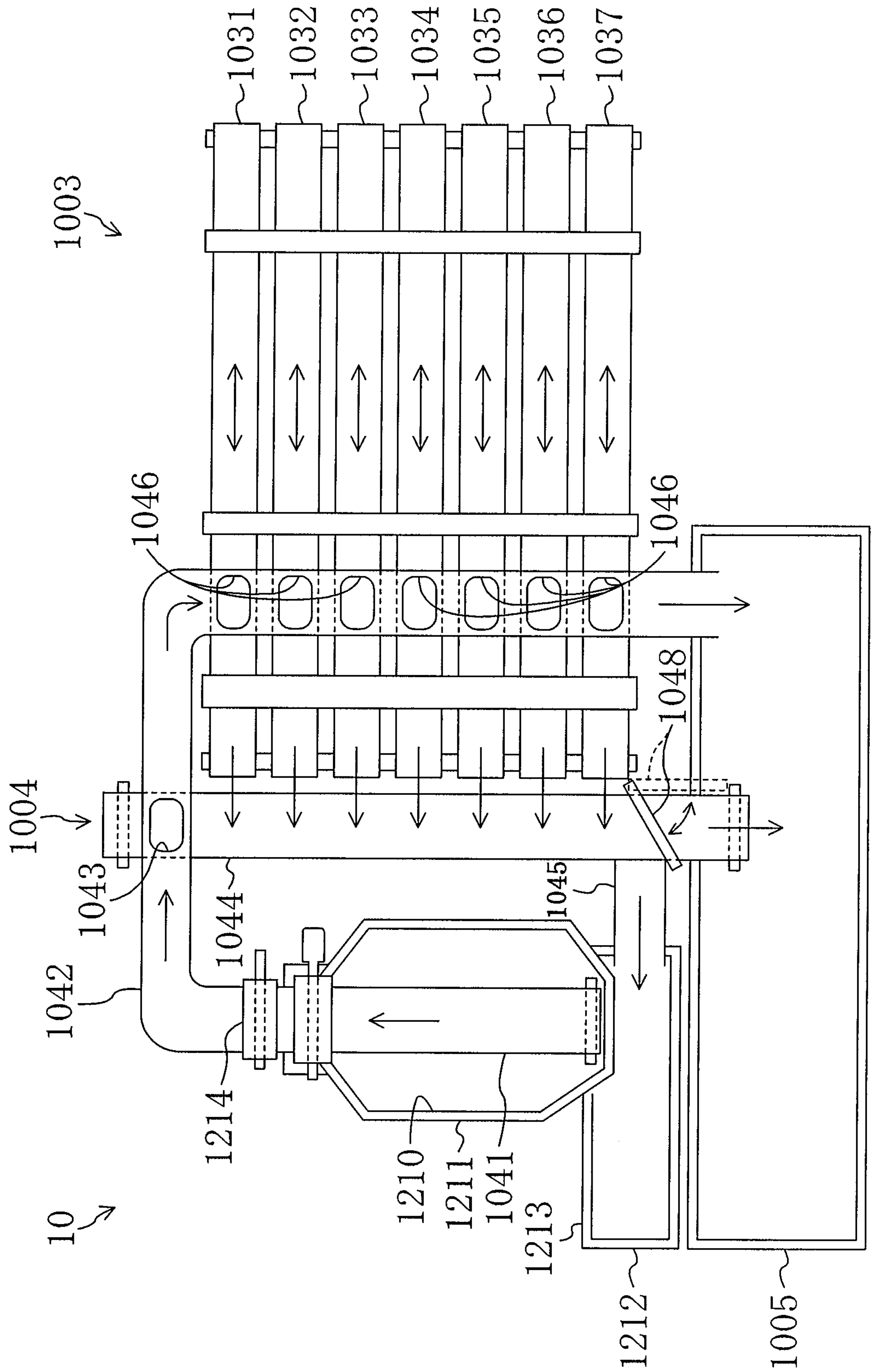
FIG. 12 is a schematic view illustrating the inner structure of a coin depositing and dispensing machine.

The depositing and dispensing machine described above is a banknote depositing and dispensing machine. However, the present invention can be applied to a coin depositing and dispensing machine. FIG. 12 shows the coin depositing and dispensing machine.

Like the banknote depositing and dispensing machine 1 described above, the coin depositing and dispensing machine 10 includes a depositing unit 1211 having an inlet 1210 through which coins are introduced, a recognition unit 1214 configured to recognize and count the coins, a dispensing unit 1213 having an dispense box 1212 to which the coins are dispensed, an inner storage unit 1003 configured to store the coins, and a transport unit 1004 configured to transport the coins among the above-described units.

A feeding belt 1041 configured to feed the introduced coins one by one is arranged on the bottom of the inlet 1210, and a recognition transport path 1042 is arranged to continue from the feeding belt. The recognition unit 1214 is arranged in the recognition transport path 1042.

A reject gate 1043 having an open/close mechanism (not shown) is arranged in the recognition transport path 1042 downstream of the recognition unit 1214 to divert reject coins etc. A relay transport path 1044 configured to transport the coins in the horizontal direction (the vertical direction in FIG. 12) is provided below the reject gate 1043. The reject gate 1043 is controlled to be open or closed in the bulk handling mode as described later.

A dispense transport path 1045 configured to receive the coins from the relay transport path 1044, and transporting the coins forward (leftward in FIG. 12) is provided at a right end of the relay transport path 1044 (a lower end in FIG. 12). The dispense transport path 1045 is connected to the dispense box 1212 of the dispensing unit 1213.

A diversion mechanism 1048 configured to change the destination of the coins between the relay transport path 1044 and the dispense transport path 1045 is provided at a junction between the relay transport path 1044 and the dispense transport path 1045. A right end of the relay transport path 1044 downstream of the diversion mechanism 1048 is connected to the outer stacking unit 1005. The diversion mechanism 1048 is controlled by a controller which is not shown, thereby sending the coins to the dispense box 1212 or the outer stacking unit 1005.

Although not shown, the outer stacking unit 1005 has an outlet opened outside the casing. Thus, the coins stacked in the outer stacking unit 1005 can be removed directly from the outside of the casing without opening the casing. The capacity of the outer stacking unit 1005 is larger than the capacity of the depositing unit 1211, and is larger than the capacity of the dispense box 1212. Thus, in the depositing, there is no need to remove the coins at multiple times after single introduction of the coins to the depositing unit 1211. To allow easy removal of the coins from the outer stacking unit 1005, although not shown, a box which can be drawn out etc. may be placed in the outer stacking unit 1005, and the box and the coins contained therein may be removed.

The inner storage unit 1003 is provided in the casing which is not shown, and the coins stored in the inner storage unit 1003 cannot be removed unless the casing is opened. The inner storage unit 1003 includes belt-shaped coin storing/feeding units 1031-1037 configured to store the coins of different denominations. The coin storing/feeding units 1031-1037 are aligned in the horizontal direction to be positioned below sorters 1046 which are aligned in the horizontal direction, and correspond to different denominations, respectively. Each of the sorters 1046 has an open/close mechanism which is not shown. According to the denominations of the transported coins, the sorters 1046 are opened or closed to sort the coins by denomination. With the belt-shaped coin storing/feeding units 1031-1037 being driven, the coins which passed through the sorters 1046 are stored in the coin storing/feeding units 1031-1037. Alternatively, the coins are sent to the relay transport path 1044 with the coin storing/feeding units 1031-1037 being driven in the reverse direction.

A downstream end of the sorters 1046 is connected to the outer stacking unit 1005. With all the sorters 1046 closed, the coins travel over the sorters, and are stacked in the outer stacking unit 1005.

In performing the depositing in the normal handling mode (a first deposit mode) in the coin depositing and dispensing machine 10 described above, the coins introduced in the inlet 1210 are fed one by one by the feeding belt 1041, and are recognized by the recognition unit 1214. The recognized coins are sent to the inner storage unit 1003 through the recognition transport path 1042, and are stored in the coin storing/feeding units 1031-1037 of the corresponding denominations based on the result of the recognition by the recognition unit 1214.

In performing the depositing in the bulk handling mode (a second deposit mode), the coins recognized by the recognition unit 1214 do not enter the sorters 1046, and are directly transferred to the outer stacking unit 1005 to be stacked therein.

In the same manner as described above, the coins of a designated denomination may be stacked in the outer stacking unit 1005, and the coins of the other denominations may be stored in the inner storage unit 1003 by opening/closing the sorters 1046.

In the above-described depositing of the coins, like the depositing of the banknotes, the deposit amount, the inner deposit amount stored in the inner storage unit, and the outer deposit amount stacked in the outer stacking unit are stored. Then, the inventory amount is updated, and the outer deposit amount is sent to the higher-ranking device.

In performing the dispensing, the coins fed from the inner storage unit 1003 are sent to the dispense transport path 1045 through the relay transport path 1044. Then, the coins are dispensed in the dispense box 1212 in the normal handling mode (a first dispense mode), or the coins are dispensed in the outer stacking unit 1005 in the bulk handling mode (second dispense mode) according to the control of the diversion mechanism 1048. In this case, the inventory amount is updated by subtracting the numbers of the dispensed coins of the different denominations from the inventory amount.

In the depositing, the capacity of the outer stacking unit 1005 is preferably twice or more as large as the capacity of the depositing unit 1211. This allows stacking of the coins twice as many as the coins which can be introduced in the depositing unit 1211 at a time in the outer stacking unit 1005. This reduces the frequency of the removal of the stacked coins.

In the above-described structure, the outer stacking unit 1005 is configured in such a manner that the coins are stacked at random. However, the coins may be aligned to be stacked in the shape of a column.

In the above example, the denomination of the coins has been described as the kind of the coins. However, like the banknotes, the coins may be sorted by whether they are fit or unfit, or whether they are of national currency or foreign currency, etc.

Although not shown, in addition to the above-described structures of the banknote and coin depositing and dispensing machines 1, 10, a door which can manually be opened, for example, may be attached to the money outlet of the outer stacking unit (the stacking unit) opened outside the casing.

Alternatively, a door which can automatically be opened when the removal is required may be attached to the money outlet. This structure also allows easy removal of the money stacked in the outer stacking unit without opening the casing.

INDUSTRIAL APPLICABILITY

As described above, the present invention can improve the efficiency of the transaction. Therefore, the present invention is useful as depositing machines, dispensing machines, and depositing and dispensing machines.

DESCRIPTION OF REFERENCE CHARACTERS

1 Banknote depositing and dispensing machine (money handling apparatus)
10 Coin depositing and dispensing machine (money handling apparatus)
11 Casing
1003 Timer storage unit
1004 Transport unit
1005 Outer stacking unit
1210 Inlet
1211 Depositing unit
1214 Recognition unit
25 Controller
26 Memory
210 Inlet
211 Depositing unit
212 Outlet
213 Dispensing part
214 Recognition unit
3 Inner storage unit
4 Transport unit
5 Outer stacking unit (stacking unit)
7 Outer stacking unit
8 Outer stacking unit

The invention claimed is:

1. A money handling apparatus for performing at least depositing, the money handling apparatus comprising:

a casing;

a depositing unit including a feeding mechanism configured to feed one by one money introduced therein;

a recognition unit configured to at least count or recognize the money fed from the depositing unit;

an inner storage unit provided inside the casing, and configured to store the money handled by the recognition unit, the money stored therein being unremovable directly from the outside of the casing;

an outer stacking unit having at least a part that is open outside the casing, is configured to stack the money handled by the recognition unit, and does not have a door restricting removal of the money stacked therein, the money stacked therein being removable at all times directly from the outside of the casing while the money is stacked in the outer stacking unit;

a transport unit configured to transport the money among the depositing unit, the recognition unit, the inner storage unit, and the outer stacking unit; and a controller configured to control the depositing unit, the recognition unit, the inner storage unit, the outer stacking unit, and the transport unit to selectively transport the money handled by the recognition unit to the inner storage unit, or the outer stacking unit, wherein a first deposit mode or a second deposit mode is selectable as a mode for the depositing, and the controller allows transport of the money handled by the recognition unit to the inner storage unit to be stored in the inner storage unit when the first deposit mode is selected by a selection signal, or the controller allows transport of the money handled by the recognition unit to the outer stacking unit to be stacked in the outer stacking unit when the second deposit mode is selected by the selection signal.

2. The money handling apparatus of claim 1, wherein the controller allows transport of the money handled by the recognition unit to the outer stacking unit to be stacked therein when a predetermined amount of the money has been stored in the inner storage unit.

3. The money handling apparatus of claim 1, further comprising:

a memory configured to store numbers of the deposited money according to kinds of the money, wherein the memory stores at least one of the numbers of the money stored in the inner storage unit according to the kinds of the money, or the numbers of the money stacked in the outer stacking unit according to the kinds of the money.

4. The money handling apparatus of claim 1, further comprising:

a dispensing unit configured to dispense the money handled by the recognition unit, wherein when a dispensing is performed, the controller allows feeding of the money stored in the inner storage unit, and dispensing of the fed money to the dispensing unit.

5. The money handling apparatus of claim 1, wherein the outer stacking unit is capable of storing a larger amount of the money than an amount of the money storable in the depositing unit.

6. The money handling apparatus of claim 1, wherein the outer stacking unit is divided into a plurality of stacking regions configured to stack the money, respectively, and a capacity ratio between the plurality of stacking regions is variable.

7. The money handling apparatus of claim 1, wherein the outer stacking unit is separated from the casing, and is detachably attached to the casing.

8. A money handling apparatus for performing at least depositing, the money handling apparatus comprising:

a casing;

a depositing unit including a feeding mechanism configured to feed one by one money introduced therein;

a recognition unit configured to at least count or recognize the money fed from the depositing unit;

an inner storage unit provided inside the casing, and configured to store the money handled by the recognition unit, the money stored therein being unremovable directly from the outside of the casing;

an outer stacking unit having at least a part that is open outside the casing, is configured to stack the money handled by the recognition unit, and does not have a door restricting removal of the money stacked therein, the money stacked therein being removable at all times directly from the outside of the casing while the money is stacked in the outer stacking unit;

a transport unit configured to transport the money among the depositing unit, the recognition unit, the inner storage unit, and the outer stacking unit; and a controller configured to control the depositing unit, the recognition unit, the inner storage unit, the outer stacking unit, and the transport unit to selectively transport the money handled by the recognition unit to the inner storage unit, or the outer stacking unit, wherein the controller is connected to a destination designating unit configured to designate a destination of the money based on a kind of the money, and is capable of receiving a designating signal from the destination designating unit, and when kinds of the money are designated by the designating signal, the controller allows transport of some of the money, which are recognized by the recognition unit, and are of the designated kind to be transported to the outer stacking unit, to the outer stacking unit to be stored therein, and the controller allows transport of some of the money, which are recognized by the recognition unit, and are of the designated kind to be transported to the inner storage unit, to the inner storage unit to be stored therein.

9. The money handling apparatus of claim 8, wherein the controller allows transport of the money handled by the recognition unit to the outer stacking unit to be stacked therein when a predetermined amount of the money has been stored in the inner storage unit.

10. The money handling apparatus of claim 8, further comprising:

a memory configured to store numbers of the deposited money according to kinds of the money, wherein the memory stores at least one of the numbers of the money stored in the inner storage unit according to the kinds of the money, or the numbers of the money stacked in the outer stacking unit according to the kinds of the money.

11. The money handling apparatus of claim 8, further comprising:

a dispensing unit configured to dispense the money handled by the recognition unit, wherein when a dispensing is performed, the controller allows feeding of the money stored in the inner storage unit, and dispensing of the fed money to the dispensing unit.

12. The money handling apparatus of claim 8, wherein the outer stacking unit is capable of storing a larger amount of the money than an amount of the money storable in the depositing unit.

13. The money handling apparatus of claim 8, wherein the outer stacking unit is divided into a plurality of stacking regions configured to stack the money, respectively, and a capacity ratio between the plurality of stacking regions is variable.

14. The money handling apparatus of claim 8, wherein the outer stacking unit is separated from the casing, and is detachably attached to the casing.

15. A money handling apparatus for performing at least dispensing, the money handling apparatus comprising:

a casing;

an inner storage unit provided in the casing to store money therein;

a recognition unit configured to at least count or recognize the money fed from the inner storage unit one by one;

a dispensing unit configured to dispense the money handled by the recognition unit;

an outer stacking unit which has at least a part that is open outside the casing, is configured to stack the money handled by the recognition unit, and does not have a door restricting removal of the money stacked therein, the money stacked therein being removable at all times directly from the outside of the casing while the money is stacked in the outer stacking unit;

a transport unit configured to transport the money among the storage unit, the recognition unit, the dispensing unit, and the outer stacking unit; and a controller configured to control the inner storage unit, the recognition unit, the dispensing unit, the outer stacking unit, and the transport unit to selectively transport the money handled by the recognition unit to the dispensing unit, or the outer stacking unit.

16. The money handling apparatus of claim 15, wherein a first dispense mode or a second dispense mode is selectable as a mode for the dispensing, and the controller allows transport of the money handled by the recognition unit to the dispensing unit when the first dispense mode is selected by a selection signal, or allows transport of the money handled by the recognition unit to the outer stacking unit when the second dispense mode is selected by the selection signal.

17. The money handling apparatus of claim 15, wherein the controller is connected to a destination designating unit configured to designate a destination of the money based on a kind of the money, and is capable of receiving a designating signal from the destination designating unit, and when kinds of the money are designated by the designating signal, the controller allows transport of some of the money, which are recognized by the recognition unit, and are of the designated kind to be transported to the outer stacking unit, to the outer stacking unit, and the controller allows transport of some of the money, which are recognized by the recognition unit, and are of the designated kind to be transported to the dispensing unit, to the dispensing unit.

18. The money handling apparatus of claim 15, wherein the outer stacking unit is divided into a plurality of stacking regions configured to stack the money, respectively, and a capacity ratio between the plurality of stacking regions is variable.

19. The money handling apparatus of claim 15, wherein the outer stacking unit is separated from the casing, and is detachably attached to the casing.

* * * * *